(12) United States Patent
Hossain et al.

(10) Patent No.: US 12,524,350 B2
(45) Date of Patent: Jan. 13, 2026

(54) SYNCHRONIZING MEMORY MANAGEMENT UNITS IN MULTI-DIELET PROCESSOR ARCHITECTURES

(71) Applicant: NVIDIA Corporation, Santa Clara, CA (US)

(72) Inventors: Hemayet Hossain, Santa Clara, CA (US); James Deming, Santa Clara, CA (US); Raymond Wong, Santa Clara, CA (US); Stewart Carlton, Santa Clara, CA (US); Wishwesh Gandhi, Santa Clara, CA (US); Piyush Patel, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/655,693

(22) Filed: May 6, 2024

(65) Prior Publication Data
US 2025/0291736 A1 Sep. 18, 2025

Related U.S. Application Data

(60) Provisional application No. 63/566,359, filed on Mar. 17, 2024.

(51) Int. Cl.
*G06F 12/1009* (2016.01)

(52) U.S. Cl.
CPC .............. *G06F 12/1009* (2013.01)

(58) Field of Classification Search
CPC .................................. G06F 12/1009
See application file for complete search history.

(56) References Cited

U.S. PATENT DOCUMENTS

| | | | | |
|---|---|---|---|---|
| 10,255,109 B2 * | 4/2019 | Koker | ............... | G06T 1/20 |
| 2022/0121383 A1 * | 4/2022 | Yang | ............... | G06F 12/1009 |

OTHER PUBLICATIONS

U.S. Appl. No. 18/606,924, filed Mar. 15, 2024, Milne.
U.S. Appl. No. 17/691,621, filed Mar. 10, 2022, Palmer.
U.S. Appl. No. 63/566,359, filed Mar. 17, 2024, Hossain.
U.S. Appl. No. 17/691,690, filed Mar. 10, 2022, Prabhakar.

* cited by examiner

*Primary Examiner* — Chie Yew
(74) *Attorney, Agent, or Firm* — Nixon & Vanderhye, P.C.

(57) ABSTRACT

This disclosure describes supporting distributed graphics and compute engines in a multi-dielet parallel processing system, such as, for example, a multi-dielet graphics processing unit (GPU), architectures and synchronizing memory management in such architectures. Respective dielets each has a memory management unit (MMU). The processing of at least one memory-related message type is serialized by a designated MMU for messages originated at any dielet, and the processing of at least some memory-related message types is performed locally on the originating dielets.

27 Claims, 16 Drawing Sheets

Example General Processing Cluster

SYNCHRONIZING MEMORY MANAGEMENT UNITS IN MULTI-DIELET PROCESSOR ARCHITECTURES

CROSS REFERENCE TO RELATED APPLICATIONS

This application claims priority from U.S. Provisional Patent Application No. 63/566,359 filed Mar. 17, 2024, the entire content of which is herein incorporated by reference. This application is also related to U.S. application Ser. No. 18/606,924 titled "Method and Apparatus for Supporting Distributed Graphics and Compute Engines and Synchronization in Multi-Dielet Parallel Processor Architectures," filed Mar. 15, 2024, the entire content of which is also herein incorporated by reference.

FIELD

This technology generally relates to multi-dielet processors. More particularly, the technology herein relates to distributed graphics and compute engines on multiple dies and synchronizing of memory operations in such processors.

BACKGROUND

The demand for processors that have extensive parallel processing capabilities, such as, for example, graphics processing units (GPU), continues to increase. The processing demands on such processors are also growing rapidly in complexity and magnitude of workloads, and rate of throughput.

The demands for a GPU to excel at workloads of rapidly growing complexity, magnitude and throughput drive a push to pack an ever-increasing number of components on the GPU semiconductor die—generally a thumbnail sized square of flat semiconductor material such as silicon cut from a wafer, on which circuitry is fabricated. The more components that are packed on a die, the more functionality that can be provided by an integrated circuit chip package including the die. Therefore, chip designers have been striving to pack an ever increasing number and variety of components onto each physical die.

There are physical limitations as to how many components can be packed onto a single die. For example, packing more transistors generates more heat that could damage the chip unless cooling is managed appropriately. More components, often smaller components, on a single die can also make interconnects difficult to implement and can cause signal issues and the like on the interconnects. Additionally, Moore's law notwithstanding, some components may have a minimum physical size beyond which they cannot easily be further miniaturized.

Therefore, the push to pack more components on a single die may encounter difficult to overcome limits on the number of components, types of components, or the physical size of the processors, while the workload demands continue to grow. To address the growing workload demands, in addition to packing higher numbers and types of components on a single die, other manners of expanding the processing capacities and capabilities of processors such as GPUs may be explored.

DETAILED DESCRIPTION OF EXAMPLE NON-LIMITING EMBODIMENTS

Figure 1:
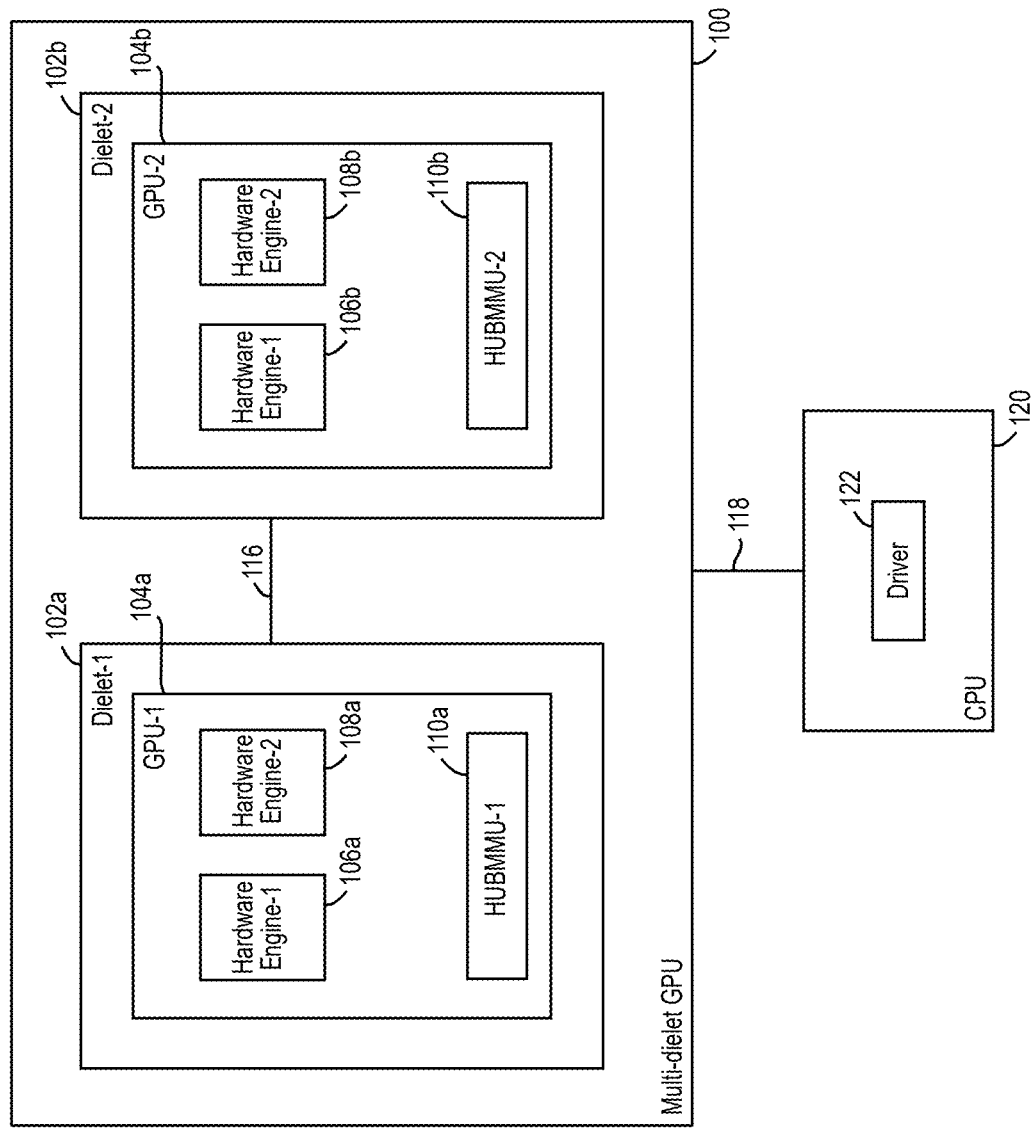
FIG. 1 illustrates a multi-dielet GPU according to some embodiments of the present disclosure.

In order to address the issue of how to squeeze in an ever-increasing number of components on a single die, it has been proposed to interconnect multiple physical dies ("dielets") together to form a larger and more complex processing system such as a GPU. In this disclosure, each of the multiple dies in such a larger processing system is referred to as a "dielet." Such larger processing systems are referred to herein as "multi-dielet processing systems". Designing a processing system beyond the bounds of a single fabricated die, as is the case with a multi-dielet processing system, provides a new path to scalability and removes some previously existing physical limitations.

For purposes of description, this disclosure references a multi-dielet GPU having two independently fabricated dielets, where each dielet contains one or more streaming multiprocessors (SMs), specific and general purpose hardware engines, and associated routing components used for application performance on behalf of CPU or GPU initiated processes. In some embodiments, the dielets may be identical (i.e., identical or substantially identical hardware). In such cases, the multi-dielet GPU may have duplicate components between the two dielets. Depending on the application, such duplicate components may be utilized or may be redundant. In some embodiments, the GPUs on the dielets may not be identical, and some GPUs may have different collections of hardware units. It is necessary that example embodiments accommodate different scenarios of combining multiple GPUs with different capabilities.

As such larger GPUs are formed, however, it is often necessary, or efficient, to shield the software from having to have knowledge of the physical layout of such a larger GPU. Such shielding may be necessary, for example, to ensure that the multi-dielet GPU can be interoperable in many usage scenarios without extensive modifications to customize the software stack for each scenario. Such shielding of the software from having knowledge of the detailed organization of the multi-dielet GPU enables, at least in some instances, the retrofitting of different multi-dielet GPUs to existing software (e.g., GPU driver software). The shielding can also "future-proof" multi-dielet designs by ensuring that the software can operate with such multi-dielet GPUs irrespective of the specific design (e.g., number of dielets, types and number of hardware engines on each dielet, etc.).

The multi-dielet processing system of example embodiments is configured to, entirely or at least to a large extent, be seen as a single processor by software such as the driver software running on a CPU of a system that includes the multi-dielet processing system. One aspect of presenting the multi-dielet processing system to software as a single processor includes presenting a single logical memory management unit (MMU) to the software. Since each dielet requires memory translation and protection and the dielets are to be exposed to software as a single processor, the multi-dielet processing system is configured to synchronize the multiple MMUs, particularly the highest level MMU on each of the dielets, with each other to form a single logical MMU.

If not for the hardware mechanisms described in this disclosure to provide synchronizing among the MMUs of the multiple dielets, software would have had to provide the necessary coordination among the respective MMUs. That would also require developers to specifically recognize that they are addressing multiple GPUs, in a manner similar to what is required in peer-to-peer combination of multiple independent GPUs. Such software-based coordination would, in addition to having negative effects on performance, also impose high development costs.

FIG. 1 illustrates a multi-dielet GPU 100, according to some embodiments of the present disclosure. The multi-dielet GPU 100 comprises two dielets—dielet-1 102a and dielet-2 102b. Each dielet includes a GPU, with dielet-1 102a having GPU-1 104a and dielet2 102b having GPU-2 104b. In some embodiments, GPU-1 and GPU-2 may each correspond to a parallel processing unit (PPU) 800 such as that shown in FIG. 8.

The dielets may be interconnected by one or more high speed links 116 for exchanging commands, data and/or control. In some embodiments, the high speed link is a NVLink interface. In an embodiment in which the multi-dielet GPU 100 comprises two dielets, a chip-to-chip high bandwidth interface on each dielet may be the one or more high speed links 116. Embodiments are not limited in the number of dielets included in the multi-dielet GPU, or the number of GPUs on each dielet. The multi-dielet GPU may additionally have any number of dielets that have no GPUs.

Each dielet includes a plurality of hardware engines. In the illustrated embodiment, dielet-1 includes hardware engine-1 106a and hardware engine-2 108a, and dielet-2 includes hardware engine-1 106b and hardware engine-2 108b. The hardware engines may include compute units, graphics units, encoding/decoding units, encryption/decryption units, etc. As noted above, in some embodiments, dielet-1 and dielet-2 each may include a processor like the PPU in FIG. 8, which comprises a plurality of general processing clusters (GPCs) (e.g., FIG. 9A) and each GPC includes a plurality of streaming multiprocessor (SM) 940 shown in FIGS. 9A and 10A. SMs may execute compute workloads and graphics workloads and can be considered as hardware engines. When referencing "hardware engines" herein, this includes but is not limited to those used in graphics and compute applications, video encoding or decoding, units in GPC and SYS clusters, and units with DMA capabilities. Embodiments are not limited to any particular number of hardware engines and/or to any type(s) of hardware engines on each GPU.

Each dielet also includes at least one memory management unit (MMU). Similar to CPUs, GPUs also use MMUs to translate virtual addresses used by programs or processes into physical addresses in memory. This is because programs typically utilize a larger virtual address space than the physical memory available on the GPU. The MMU acts as a bridge, mapping these virtual addresses to their corresponding physical locations, enabling efficient memory access for various GPU operations. MMUs in GPUs contribute to memory protection by enforcing access permissions. They can control which parts of memory different processes running on the GPU can access. This helps prevent unauthorized access, data corruption, and potential security vulnerabilities. Additionally, MMUs can help manage memory allocation and usage for different tasks running concurrently on the GPU.

In some embodiments, each dielet may have one or more other MMUs that are each configured to service memory-related requests at component levels on the dielet. For example, some embodiments may include a GPC MMU for each GPC (see, e.g., FIG. 9A) in the GPU and/or an input/output MMU (IO MMU). The highest level MMU on each dielet is herein referred to as the hub MMU or "HUBMMU". In some embodiments, the HUBMMU is a GPU MMU ("GMMU") with separate virtual address spaces and page tables for each process. In the illustrated embodiment, the HUBMMU-1 110a is on dielet-1 and HUBMMU-2 is on dielet-2. Each HUBMMU enables hardware engines on its dielet to access memory by providing virtual address translation, memory protection, etc. All HUBMMUs of the multi-dielet GPU, in this example, HUBMMU-1 and HUBMMU-2, cooperate to synchronize memory accesses for entities on all the dielets and to present a single logical MMU to software.

The capability to present a monolithic view of the multi-dielet GPU 100 is provided so that the external entities, such as, for example, driver 122 software executing on the CPU 120 that communicates with the multi-dielet GPU 100 over an interface 118 (e.g., a PCI interface) can treat the multi-dielet GPU 100 as a single monolithic GPU. That is, the monolithic GPU view enabled by the circuitry in multi-dielet GPU 100, including the circuitry of the HUBMMUs, allows software, such as, for example, driver software 122, to be agnostic with respect to the specific structure of the multi-dielet GPU 100. U.S. application Ser. No. 18/606,924 titled "Method and Apparatus for Supporting Distributed Graphics and Compute Engines and Synchronization in Multi-Dielet Parallel Processor Architectures," filed Mar. 15, 2024 and herein incorporated by reference in its entirety, describes a hardware implementation in the multi-dielet GPU to map between its dielet-local hardware engine identifiers and globally unique engine identifiers that enables the software to view the multi-dielet GPU as a single monolithic GPU.

Before describing the mechanisms provided in embodiments of this disclosure to synchronize MMUs across all the dielets of a multi-dielet GPU, the importance of the MMU may be illustrated by describing its role in a memory access by a hardware engine. Considering an example process running on a hardware engine (e.g., SM) of dielet-1 that requires access to an object in memory, the process first generates a virtual address pointing to the location of the object within the GPU memory (local/remote) or CPU memory. This virtual address is then used in the instructions to access the object. The process, or the corresponding hardware engine, sends a request containing the generated virtual address to the MMU. The MMU may look up the virtual address in its translation lookaside buffer (TLB), which is a cache that stores recently translated addresses, thereby improving translation speed. If the virtual address is found in the TLB, the corresponding physical address in GPU memory (local/remote) or CPU memory is retrieved from the TLB entry. This physical address points to the actual location of the sought object within the GPU memory (local/remote) or CPU memory. If the virtual address is not found in the TLB, a TLB miss occurs. The MMU then performs a more complex lookup process using page tables. Page tables are data structures that map virtual addresses to physical addresses for larger memory regions. The MMU accesses the page tables stored in memory to identify the physical address corresponding to the virtual address. This process may involve traversing multiple levels of page tables depending on the system's memory organization. When the page table walk is complete, the MMU obtains the physical address of the object in GPU memory (local/remote) or CPU memory. The requesting hardware engine receives the physical address from the MMU and uses it to access the object in GPU memory (local/remote) or CPU memory.

During the above described example process, the MMU may also determine whether the requesting process and/or hardware engine is authorized to access the requested memory. Unauthorized memory access attempts may cause the MMU to generate a fault to be reported to the software and/or CPU. Thus, in this manner, the MMU is a key component in the functioning of a GPU.

Figure 2:
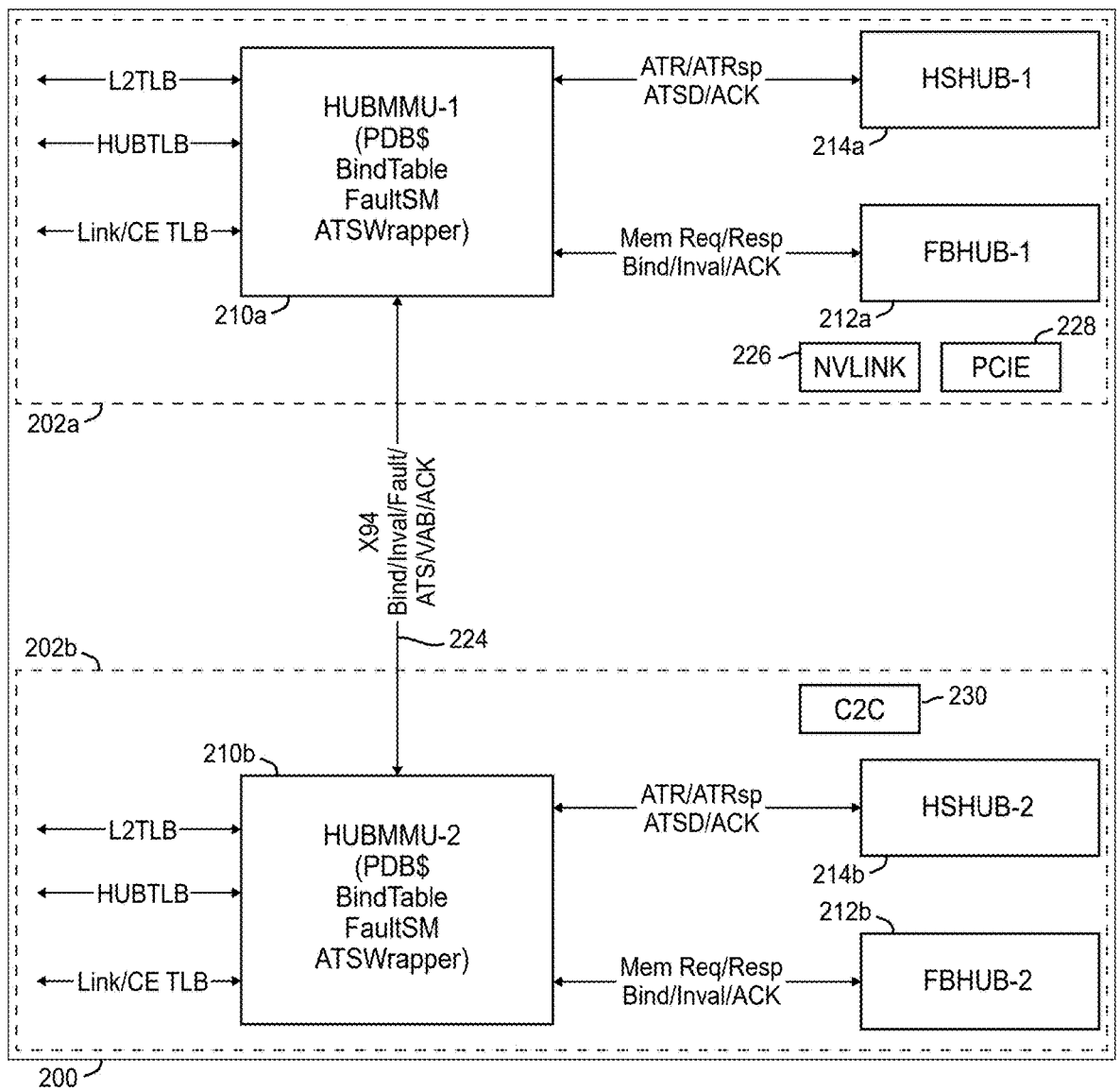
FIG. 2 illustrates another multi-dielet GPU according to some embodiments of the present disclosure.

FIG. 2 illustrates another multi-dielet GPU 200 according to some embodiments. FIG. 2 schematically illustrates, in an example 2-dielet processing system 200, example communications involving the HUBMMU.

The multi-dielet GPU 200 includes dielet-1 202a and dielet-2 202b. Dielet-1 includes HUBMMU 210a, high speed hub (HSHUB) 214a and frame buffer hub (FBHUB) 212a. Dielet-2 includes HUBMMU 210b, HSHUB 214b and FBHUB 212b.

The bind table is a data structure storing information about the association between virtual memory regions and physical memory frames allocated to different processes running on the GPU. Each entry in the bind table may include: the range of virtual addresses used by a process, the starting address of the physical memory frame allocated for the corresponding virtual address range, and access permissions (read, write, execute) associated with the memory region for protection.

The page table bind cache (PDB cache) is a hardware cache located in the HUBMMU. It may store roots of currently used page tables for virtual to physical addresses for various GPU processes. A TLB miss requires retrieving the page table root for that process and performing a page table walk using the retrieved root.

When a program tries to access data using a virtual address, the MMU first checks the page table bind cache. If the translation (mapping between virtual and physical address) for that specific address is found in the cache, the MMU can efficiently translate the address and grant access to the corresponding physical memory location. This avoids the need to access the main page tables (which are typically slower to access than the cache), reducing memory access latency and improving overall performance.

The bind table and/or the PDB cache in the HUBMMU 210a can be accessed by the hub translation lookaside buffer (HUBTLB) or a process accessing the HUBTLB and resulting in a TLB miss. Other TLBs, such as L2 TLB and Link/CE TLB can access the HUBTLB when misses result from their respective lookups. The TLBs may have their TLB entries updated with entries provided by the HUBMMU as a result of looking up the bind table or PDB cache lookup, or a page table walk. In some embodiments, the TLBs may have their TLB entries updated with entries provided by the HUBMMU as a result of looking up the bind table and PDB cache and a page table walk.

With respect to memory requests, memory responses, bind requests and responses, TLB invalidation requests and responses, and various acknowledgments, the HUBMMU on one dielet communicates with other HUBMMUs residing on other dielets in the multi-dielet GPU. In some embodiments, these communications may proceed to the other dielets via the FBHUB 212a.

ATS requests, ATS responses, ATS Shootdown/Invalidations (ATSD), and associated acks may be communicated between the HUBMMU and the high speed hub (HSHUB) 214a.

The communications between HUBMMU 210b of the second dielet 202b and the various TLB, HSHUB 214b, and FBHUB 212b may be the same or similar as with HSHUB 214a of the first dielet 202a.

Moreover, HUBMMU-1 and HUBMMU-2 may be configured to exchange messages. For example, bind requests and acknowledgments, TLB invalidate requests and acknowledgments, fault reporting, ATS requests, virtual address bus/breakpoint (VAB) dump requests, etc. In some embodiments, at least some of the messages sent from one HUBMMU to another are transmitted over a connection 224 that is different from the dielet-to-dielet connection (e.g., 116). In some embodiments, the connection 224 is a dedicated HUBMMU-to-HUBMMU connection over a dielet-to-dielet connection such as 116.

In the illustrated 2-dielet processing system 200, dielet-1 202a and dielet-2 202b have different types of network interfaces—dielet-1 includes an NVLINK interface 226 and a PCIE interface 228, and dielet-2 includes a chip-to-chip interface 230. In an example embodiment, the PCIE interface 228 may be used for memory access, the NVLINK interface 226 and the chip-to-chip (C2C) interface 230 may be used to connect to a CPU and other devices (e.g., other GPUs, multi-dielet processing systems, etc.). In some embodiments, dielet-1 and dielet-2 may be identical and have identical network interface hardware, but one or more of the network interfaces on each dielet may be deactivated or unused. For example, whereas dielet-1 and dielet-2 may both include NVLINK, PCIE and C2C connectors, the C2C connector on dielet-1 may be inactive, and the NVLINK and PCIE interfaces on dielet-2 may be inactive.

In the illustrated embodiments of FIG. 1 and FIG. 2, each dielet includes a HUBMMU. However, in some embodiments, at least some dielets may include MMUs at the component level such as, for example, one or more GPC level MMU ("GPCMMU") and a high speed hub level MMU ("HSHUBMMU"). In some embodiments, all 3 types of MMU modules (GPCMMU, HUBMMU, and HSHUBMMU) are active in both dielets. GPCMMUs and HSHUBMMU in one dielet do not communicate with GPCMMUs and HSHUBMMU in the other dielet. Rather, GPCMMUs/HSHUBMMU in a dielet communicate with HUBMMU of same dielet and then the HUBMMU in one dielet communicate with the HUBMMU in the other dielet.

In some embodiments, the HUBMMU to HUBMMU communication may be through a private bus. The private bus may be used to keep MMUs in the two dielets in-sync for bind operations, TLB invalidations, fault reporting, security vector update, and ATS request handling. Although the MMU-private bus is used for sync commands as identified above, ATS response, ACK communications, other memory commands and data transfer (for GMMU page table walk memory access data, fault packet, VAB data dump into memory) may be sent through FBHUB of corresponding dielet. This may provide for faster synchronization of the HUBMMU.

Thus, in some embodiments, both dielets of a 2-dielet processing system have the HUBMMU active with minimal communication between them. Example dielet MMU operations may include several message types and request/response types.

All engines and other clients on one dielet are served by the MMUs on that dielet. The HUBMMU in one dielet performs page table walk independently without requiring any information from HUBMMUs of other dielets. The TLB in one dielet does not communicate with TLBs in other dielets. For example, in some embodiments each dielet may have a HUBTLB and one or more component-level TLB (e.g., any of uTLB, gpcL1TLB, gpcL2TLB, and LinkTLB), but none of the TLB on one dielet communicates with any TLB on other dielets.

Engines and other clients send bind requests, and TLB invalidation requests to the HUBMMU of the same dielet. HUBMMUs communicate among themselves to keep MMUs in-sync, however, both dielets perform bind operation independently in parallel to generate combined acknowledgement to the requester.

In some embodiments, the bind operation is always initiated by the primary dielet. The secondary dielet(s) forwards its local bind request to the primary dielet. TLB Invalidation operation too may be always initiated by the primary dielet. The secondary dielet(s) forwards its local invalidation requests to the primary dielet. Fault reporting is always initiated by the primary dielet. Faults from the secondary dielet(s) are forwarded to the primary dielet. VAB memory dump is always initiated by the primary dielet. VAB dump requests from the secondary dielet(s) are forwarded to the primary dielet. ATS/ATSD request, response, and acknowledgment communications (with HSHUB) are always done by a secondary dielet. The primary dielet sends its ATS requests to the designated secondary dielet's HUBMMU to forward to HSHUB (ultimately to the system MMU (SMMU)).

The PDB cache in one dielet is not a mirror of other dielets' PDB cache and works independently when handling bind commands, page table walk, and invalidation. For bind commands, the PDB ID associated with same PDB can be different on different dielets.

As described above, certain MMU operations are performed only by one dielet, and other dielets' MMU works in sync with the performing dielet for such operations. Also, at least in some embodiments, each dielet can be configured to work as an independent GPU (e.g., for production and testing). Thus, embodiments of the present disclosure provides for each dielet in a multi-dielet processing system to know its dielet identifier and operational role.

Each HUBMMU may, for example, based on the configuration setting of one or more fuses and/or registers, determine whether it is configured as a primary dielet, secondary dielet, or standalone dielet in its operational role. Each HUBMMU may also, based on the setting of one or more fuses and/or register, determine its dielet identifier. The dielet identifier is used to uniquely identify a dielet within the multi-dielet processing system.

In some embodiments, the HUBMMU to HUBMMU communication may be via a connection through a dielet-to-dielet connection crossbar. The HUBMMU to HUBMMU connection may be configured to carry packets for a particular set of operations: MMU bind (e.g., original bind packet from client(s)), TLB invalidation, ATS request (ATR), ATS invalidation (ATSD), ATS response (ATRsp)-data packet from secondary to primary, fault (internal) packet, VAB dump request, VAB (internal) mask-data packet, and acknowledgments of the above operations. The HUBMMU to HUBMMU connection may be exclusively reserved for the above identified packets. In some embodiments, the connection may be shared with other components such as, for example, FBHUB to enable such components also to transfer select types of packets over.

In some embodiments, the HUBMMU includes a buffer to queue packets that are to be transmitted and/or packets that are received. In some embodiments, the HUBMMU may implement a blocking thread and a non-blocking thread to transmit messages. For example, the blocking thread may transmit bind, TLB invalidation, blocking fault, VAB, ATS, and associated acknowledgments, and the non-blocking thread may be used to transmit non-blocking faults and associated acknowledgments.

Figure 3:
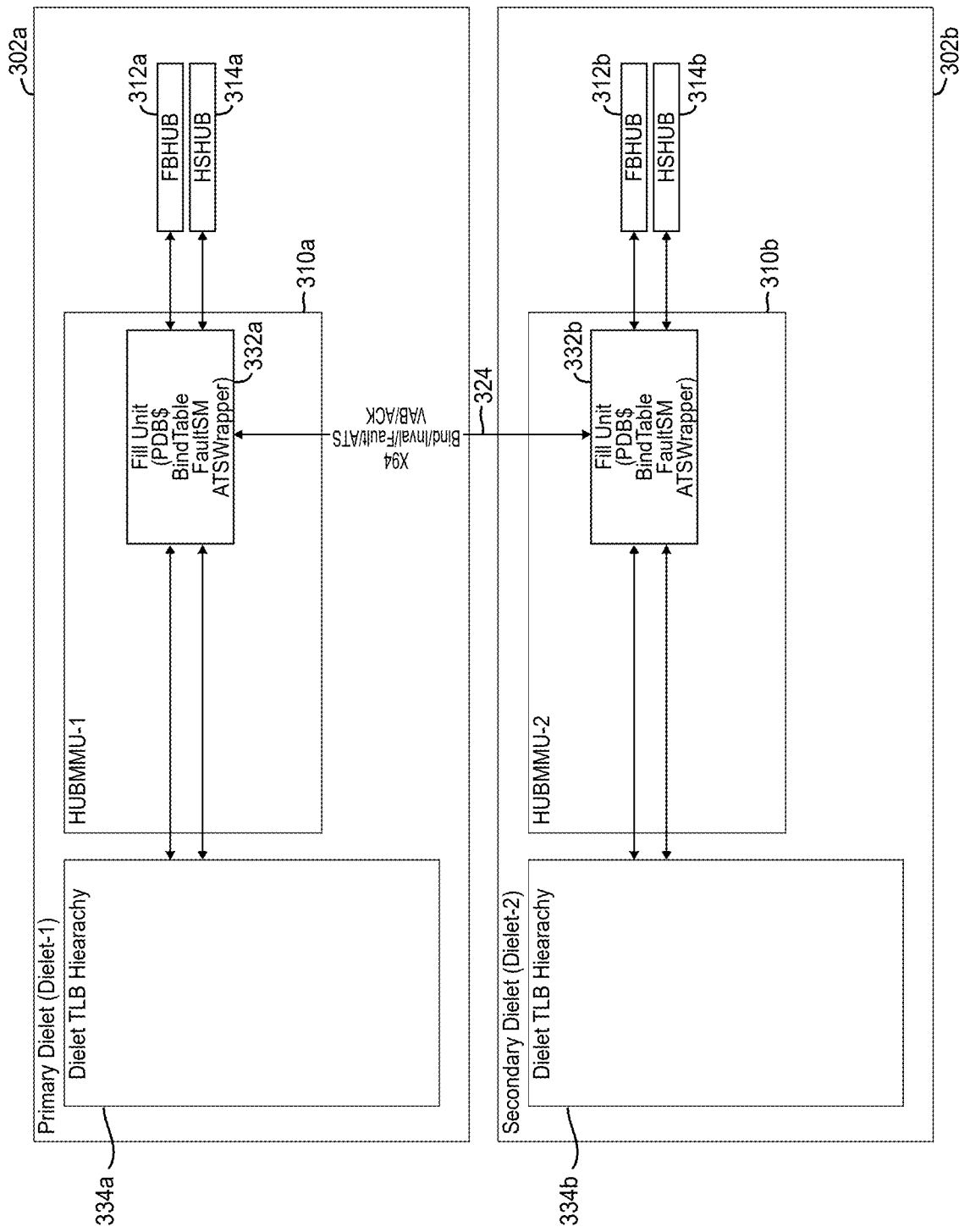
FIG. 3 schematically illustrates an example of a translation lookaside buffer (TLB) hierarchy arrangement in each dielet of a multi-dielet GPU according to some embodiments of the present disclosure.

FIG. 3 schematically illustrates an example of a hierarchical TLB arrangement in each dielet of a 2-dielet processing system according to some embodiments. In the 2-dielet processing system of FIG. 3, dielet-1 302a is configured as the primary dielet and dielet-2 302b is configured as the secondary dielet.

The primary dielet 302a includes a HUBMMU (HUBMMU-1) 310a that communicates with FBHUB (FBHUB-1) 312a and HSHUB (HSHUB-1) 314a that are also in the dielet. HUBMMU-1 310a includes a fill unit 332a configured to communicate with a dielet TLB hierarchy 334a. The fill unit 332a is also configured to communicate over an interface 324 with the fill unit of the HUBMMU (HUBMMU-2) 310b in dielet-2 302b. The fill unit 332a may include a PDB cache and a bind table. It may also include a fault state machine and/or an ATS wrapper function.

The dielet TLB hierarchy 334a may include a hub-level TLB, and a level 1 (L1) TLB for each GPC on the dielet in order to speed up access to the respective L1 caches. The dielet TLB hierarchy 334a may also include one or more level 2 (L2) TLBs for one or more of the GPCs on the dielet, and/or L1 TLBs for respective links (e.g., network interfaces). TLB invalidates from the HUBMMU are communicated to the respective local (e.g., component level) TLBs of the dielet TLB hierarchy, and the respective local TLBs return corresponding acknowledgments.

Dielet-2 302b may have identical configuration of the TLB hierarchy, including the dielet TLB hierarchy 334b. The configuration of the HUBMMU 310b, fill unit 332b, the FBHUB 312b and HSHUB 314b may be identical or similar to the corresponding components in dielet-1 302a.

Figure 4:
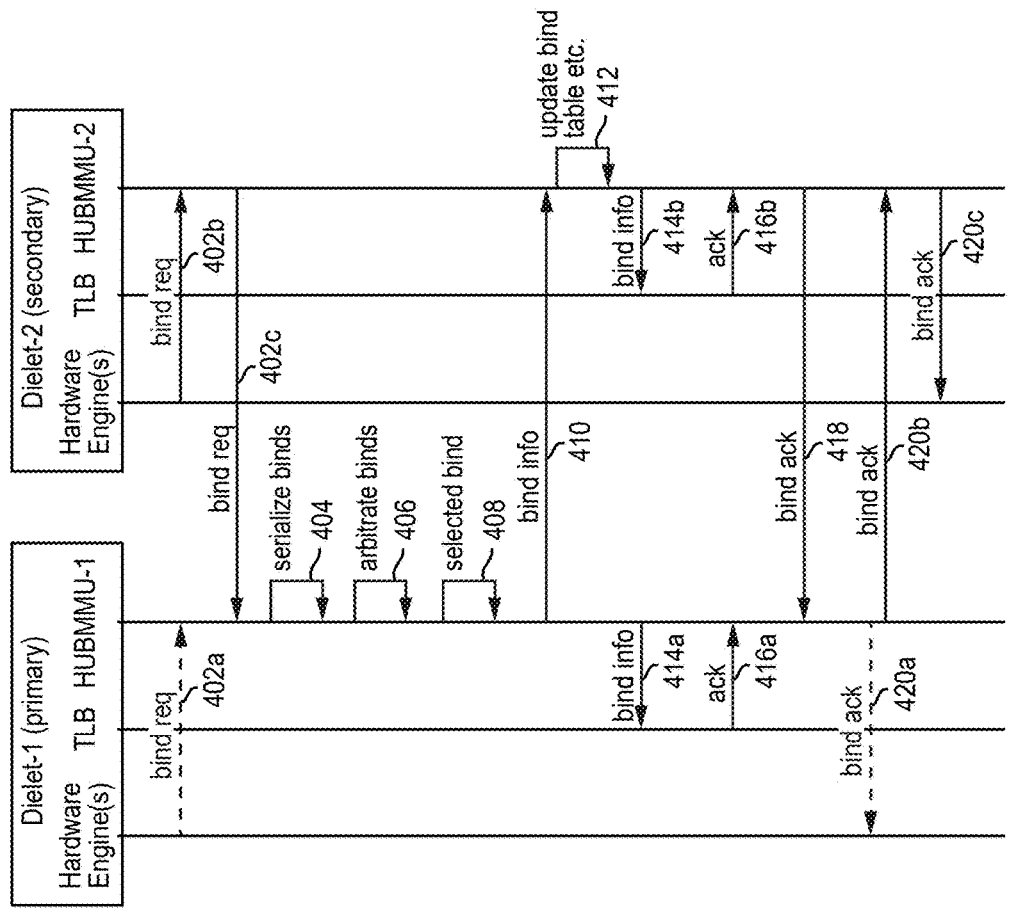
FIG. 4 illustrates a flowchart for a bind process in a multi-dielet processing system such as those shown in FIGS. 1-3, according to some embodiments of the present disclosure.

FIG. 4 illustrates a flowchart 400 for a bind process in a multi-dielet processing system such as those shown in FIGS. 1-3, according to some embodiments of the present disclosure. In the illustrated configuration, dielet-1 is set as primary, and dielet-2 is set as secondary. The multi-dielet processing system is configured to have the primary dielet implement the bind operation.

The bind operation links an engine (e.g., graphics engine, Copy/DMA engine (CE), security/integrity engine, and more) to an instance block in HUBMMU so that HUBMMU can translate subsequent memory requests from that engine (or client from that engine). The instance block holds the corresponding page table pointer.

In some embodiments, the HUBMMU does not distinguish between which engine can be bound to which dielet although, in some cases, only VEIDs (graphics engine), base address register (BAR) engines, CEs, and PMA engines are expected to be accessed in both dielets.

The HUBMMU of each dielet may include a bind table and a PDB cache. The bind table and PDB cache in each HUBMMU may be configured (e.g., sized) to support all engines across all the dielets in the multi-dielet GPU. However, both the bind table and the PDB cache in one dielet are configured to work independently with respect to the bind tables and PDB caches in other dielets. Thus, the same PDB ID might point to different page tables in different dielets. The bind table entries may be indexed by engine IDs, and therefore the same indexed entry will have same bind information in all dielets.

The primary dielet is configured to initiate the bind process. The secondary dielets forward bind packets to the primary dielet to start the bind process.

When a client (e.g., hardware engine) on dielet-1 or dielet-2 issues a bind request (e.g., 402a and 402b), it is sent to HUBMMU on the same dielet. On dielet-1, the HUBMMU (HUBMMU-1) is configured to process bind requests because dielet-1 is configured as the primary. In contrast, when the HUBMMU (HUBMMU-2) on dielet-2 receives the bind request 402b from a local client, since dielet-2 is configured as secondary, it forwards (402c) the bind request to the HUBMMU-1.

The bind request packet may either be generated by the engine or may be generated as a result of the engine writing a register (e.g., a privilege register).

The HUBMMU-1, since it receives bind requests from all other dielets of the multi-dielet processing system, serializes (404) the bind requests. For example, incoming bind requests may be stored in a queue.

The HUBMMU-1 may then arbitrate (406) among the serialized bind requests to select a bind request to be processed.

At 408, the selected bind request is processed. Processing the bind request may include allocating a physical memory region to the requesting client and determining the virtual address for the allocated region. A new entry may be added to, or an existing corresponding entry may be updated in, the bind table. An entry may include a mapping between the virtual address and the allocated memory, and associated permissions.

At 410, HUBMMU-1 transmits the bind information obtained at 408, such as, for example, contents of the bind table entry, to the other dielets. In some embodiments, the bind information may include the engine ID of the sender of the bind request, the PDB cache information, and the mapped instance block pointer. Otherwise, the bind table and the PDB cache can get out of sync.

At 412, HUBMMU-2 receives the bind information from HUBMMU-1 and accordingly updates its own bind table. For example, HUBMMU-2 adds an entry to its bind table.

Each dielet, after its bind table is updated, updates its local TLB at 414 (414a and 414b), and the respective TLBs acknowledge 416 (416a and 416b) the updates. The update of the TLBs can be initiated by the HUBMMU propagating the bind information to all relevant TLBs on the same dielet.

After HUBMMU-1 receives acknowledgements from its local TLB update(s) and other dielets (dielet-2 returns acknowledgment 418), HUBMMU-1 notifies the sender of the bind request that the bind request is complete and returns the bind information to the requester. For example, if the selected bind request originated on dielet-1, then the acknowledgment 420a including the virtual address of the allocated memory and optionally other parameters is sent to the requesting local client. If the selected bind request originated on dielet-2, then the acknowledgment 420b including the virtual address of the allocated memory and optionally other parameters is sent to the HUBMMU on the requesting dielet and the HUBMMU on the requesting dielet forwards the acknowledgment and the virtual address etc. to the requesting local client. For example, HUBMMU-1 transmits the ack 420b to HUBMMU-2, which then sends it (422c) to the requesting local client on dielet-2.

The bind operation is in many instances the first requirement before a process is allocated work. It provides linking the memory system, in this case the page table, with a context and the engine that is doing the work. Thus, after the engine initiates a bind and an acknowledgment is received, the engine may be allocated work by the work distributor.

This design ensures that, in relation to a bind request, only the primary dielet accesses memory to service a bind request regardless of which dielet the request originates.

This process involves handshaking that occurs locally on each dielet to ensure that local component-level TLBs are in sync, and handshaking that occurs between the dielets to make sure they are in sync.

Figure 5:
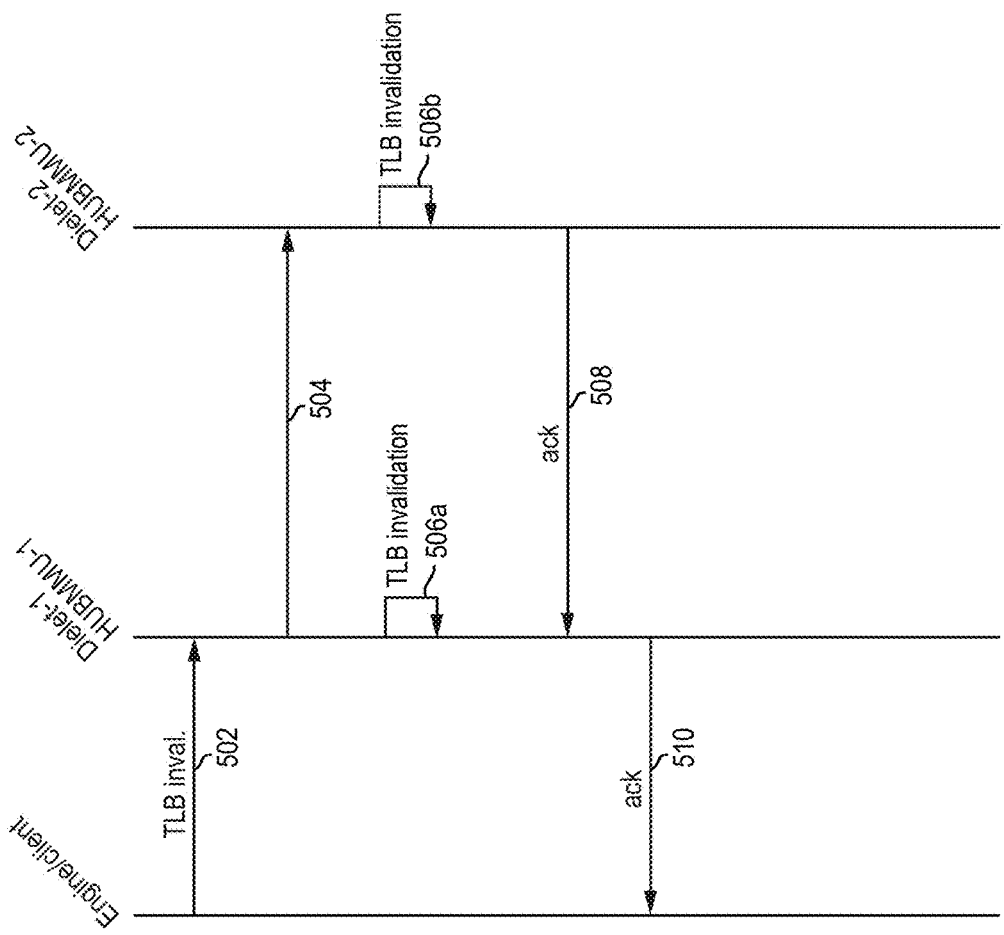
FIG. 5 illustrates a flowchart for a TLB invalidation in a multi-dielet GPU such as those shown in FIGS. 1-3, according to some embodiments of the present disclosure.

FIG. 5 illustrates a flowchart 500 for a TLB invalidation in a multi-dielet GPU such as those shown in FIGS. 1-3, according to some embodiments of the present disclosure.

TLB invalidation is the process of removing outdated entries from Translation Lookaside Buffers (TLBs) in the multi-dielet GPU. TLB invalidation may be triggered due to changes in the mapping between virtual and physical addresses (e.g., memory writes, page table updates), context switches, address space changes, etc.

TLB invalidation may be triggered by an MMU, an engine or client, or by software.

In the illustrated configuration, dielet-1 is set as primary, and dielet-2 is set as secondary. The multi-dielet processing system is configured to have the primary dielet implement the TLB invalidation operation.

TLB invalidation invalidates already fetched translations (e.g., TLB lines) either from GMMU page table walk or from ATS (IOMMU/SMMU). However, TLB invalidation does not invalidate page table entries (PTEs) or bind information.

TLB invalidation can originate from the hardware engines or clients on dielets, or may be generated based on register writes (e.g., privileged register write). TLB invalidation request in one dielet invalidates TLB lines across all dielets. However, each of the dielets invalidate independently and parallelly.

A TLB invalidate packet may have the following information that is sent across the interface to other HUBMMUs: virtual address, the PDB entry, indication whether the invalidation is for ATS entry, the originating hub ID, and requester ID.

In the illustrated embodiment, the TLB invalidation request is issued by an engine or other client on dielet-1. The engine or client sends the request 502 to the local HUBMMU—HUBMMU-1. The request may be originated by an engine, a client on an engine, front end context switch (FECS), GPU system processor (GSP), high speed hub (HSHUB) or be generated by writing to a privilege register. For example, an engine or client may send a method-based invalidation request, the HSHUB may send an ATS invalidation request (ATSD), a FECS/GSP may send uCode-based TLB invalidation request, or a HUBMMU TLB invalidate privileged register may be used to generate PRI-based TLB invalidation.

At 504, HUBMMU-1 transmits the invalidation request to all other dielets in the multi-dielet processing system.

At 506, HUBMMU-1 and HUBMMU-2 may process the TLB invalidation in parallel (e.g., 506a and 506b). In the event that the TLB invalidation information indicates that a system membar (memory barrier operation) is required, the source MMU (in this example, HUBMMU-1) performs an IO flush operation at the end of the invalidation operation. Each HUBMMU retrieves the PDB ID to invalidate from PDB cache independently based on the input PDB, and therefore PDBID may be different for the same PDB.

At 508, HUBMMU-2 returns an acknowledgment to HUBMMU-1 indicating that the TLB invalidation on dielet-2 is complete.

In another example, if the TLB invalidation request originates on dielet-2, that request is sent from the requesting client to HUBMMU-2 and HUBMMU-2 forwards the request to HUBMMU-1. This is because, HUBMMU-1 as the primary is configured to process TLB invalidations, and HUBMMU-2 as a secondary is configured to forward TLB invalidations to the primary dielet to be processed.

After it has received acknowledgments from its local TLB invalidation and other dielets, at 510, HUBMMU-1 returns an acknowledgment to the requesting client.

Figure 6A:
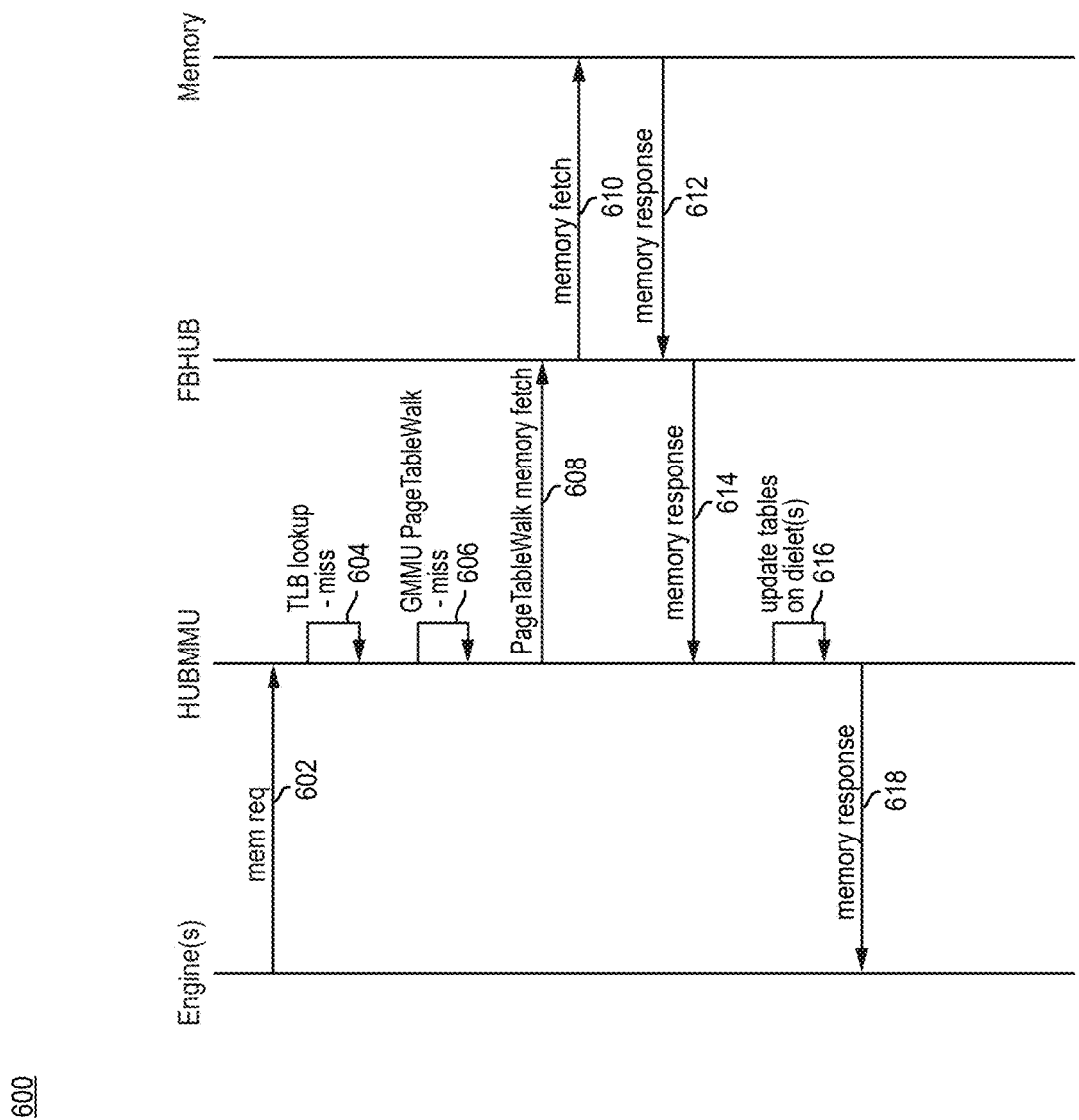
FIG. 6A illustrates a flowchart for a page table walk in a multi-dielet GPU such as those shown in FIGS. 1-3, according to some embodiments.

FIG. 6A illustrates a flowchart 600 for a page table walk in a multi-dielet GPU such as those shown in FIGS. 1-3, according to some embodiments. In the illustrated configuration, dielet-1 is set as primary, and dielet-2 is set as secondary. The multi-dielet processing system is configured to have each dielet perform the page table walk independently for TLB misses from the local TLBs.

Each HUBMMU may have its own page directory entry (PDE)/page table entry (PTE) caches to speedup GPU MMU (GMMU) page table walk. Herein the GMMU page table walk is also referred to as HUBMMU page table walk. On a local TLB miss, the HUBMMU, or more particularly a fill unit in the HUBMMU, does a GMMU page table walk based on engine bind point found in its own bind table and PDB cache.

At 602, a hardware engine issues a memory request to the local HUBMMU (e.g., HUBMMU-1 on dielet-1, HUBMMU-2 on dielet-2).

At 604, the local HUBMMU performs a TLB lookup and misses.

At 606, the local HUBMMU performs a GMMU page table walk. A miss occurs.

At 608, the local HUBMMU transmits a page table walk memory fetch via its local FBHUB. The page table walk memory fetch request is sent to the local FBHUB. The FBHUB sends the request to, via the memory crossbar, to reach memory. The target memory might be in local video memory attached to all dielets or may be in system memory. The system memory may be connected to the multi-dielet processing system through a chip-to-chip (C2C) interface C2C or PCIe interface. The memory fetch response flows through the reverse path.

At 610, the FBHUB fetches the memory and at 612, obtains the requested memory.

At 614, the FBHUB returns the memory response to the local HUBMMU.

At 616, based on the obtained memory, HUBMMU updates tables. For example, the HUBMMU may update local TLBs by returning the page table entries (or information from them) to the local TLBs including the HUBTLB.

At 618, a memory response is returned to the requesting engine.

It should be noted that in some instances the GMMU page table walk may require an Address Translation Service (ATS) fetch. In that case, the ATS request is processed like any other ATS request in the multi-dielet processing system.

In many systems the GPU is supplied with data from the host via one of the multiple memory management API calls provided by the CUDA framework, such as CudaMalloc-Managed and CudaMemCpy. Some systems have the capability to avoid the use of CUDA calls for memory management and access the same data on GPU and CPU. This may be done via the Address Translation Services (ATS) technology that provides a unified virtual address space for data allocated with malloc and new. ATS enables the CPU and GPU to share a single per-process page table, enabling all CPU and GPU threads to access all system-allocated memory, which can reside on physical CPU or GPU memory. The CPU heap, CPU thread stack, global variables, memory-mapped files, and interprocess memory are accessible to all CPU and GPU processes.

In some embodiments, the multi-dielet GPU is connected to a CPU through the C2C interface (e.g., see FIG. 2) which, in some implementation may include hardware-based memory coherency, that enables the transfer of only the data needed, and not migrate entire pages to and from the GPU. It may also enable lightweight synchronization primitives across GPU and CPU threads by enabling native atomic operations from both the CPU and GPU. ATS may, in some embodiments, leverage Direct Memory Access (DMA) copy engines on the GPU for accelerating bulk transfers of pageable memory across host and GPU. Such embodiments may enable applications to oversubscribe the GPU's memory and directly utilize CPU memory (system memory) at high bandwidth. Access to such extensive amounts of memory further facilitates high performance computing applications, graphics, virtual reality, and artificial intelligence applications.

ATS may be used with a virtual address or from a system physical address. Two types of ATS may be in use: it can either translate a virtual address to a physical address, or can translate a GPU virtual address to a GPU physical address, and then the GPU physical address to a system physical address.

In some embodiments, an ATS request may be required to be generated as part of the page table walk. The request may be generated by HUBMMU during a page table walk. In some embodiments, each dielet may perform the page table walk independently, and may at some level issue the ATS request. The type of ATS request may be based on the level of the page table walk at which the request is issued.

In FIG. 2, both dielets are shown to have support for ATS requests (ATR)/ATS Response (ATRsp) to be between the HUBMMU (e.g., fill unit of the HUBMMU) and the HSHUB. In example embodiments, however, the dielet-1 capability may be unused. Instead, dielet-1 forwards its ATR to dielet-2.

At dielet-2, the HUBMMU fill unit can accommodate up to a preconfigured maximum (e.g., 256) ATR from each of dielet-1 and dielet-2 and serialize the ATR. Up to a predetermined maximum (e.g., 256×2=512) ATR can be sent on HUBMMU-HSHUB interface (or, in some implementations, an interface between the HUBMMU fill unit and HSHUB) on dielet-2 from where it will be routed to the high speed interface (e.g., C2C) that is configured to connect to the CPU. The corresponding acknowledgments are received by dielet-2 and sent back to dielet-1 for any requests for which dielet-1 is the source.

Note that ATR/ATRsp propagation is centralized (e.g., at dielet-2), but the generation is done independently and in parallel at each dielet. Note also that another option would be for each fill unit to send its ATR to their respective HSHUBs, and then allow HSHUB-1 (instead of the fill unit of HUBMMU-1) to forward its ATR to dielet-2 to be sent through the C2C interface. This design allows for efficiently processing ATR since ATS communications occur primarily over the C2C interface in some embodiments, and, at least in some embodiments, the multi-dielet processing system's only C2C interface is on dielet-2.

The dielet-1 ATR are forwarded to dielet-2. Then the HUBMMU (e.g., fill unit of the HUBMMU) on dielet-2 sends ATR (e.g., ATR from either dielet-1 or dielet-2) to dielet-2 HSHUB to C2C to system MMU (SMMU). The SMMU processes the ATR and returns a corresponding ATRsp to dielet-2 HSHUB.

The dielet-2 HSHUB sends the ATRsp to the dielet-2 HUBMMU (e.g., fill unit of the HUBMMU). A target ID in ATR and ATRsp may be used to identify target. The ATRsp may also include one or more of a dielet ID, ATS cache ID, cache line ID and an entry ID. These parameters can be used by the source to subsequently update its local tables.

Figure 6B:
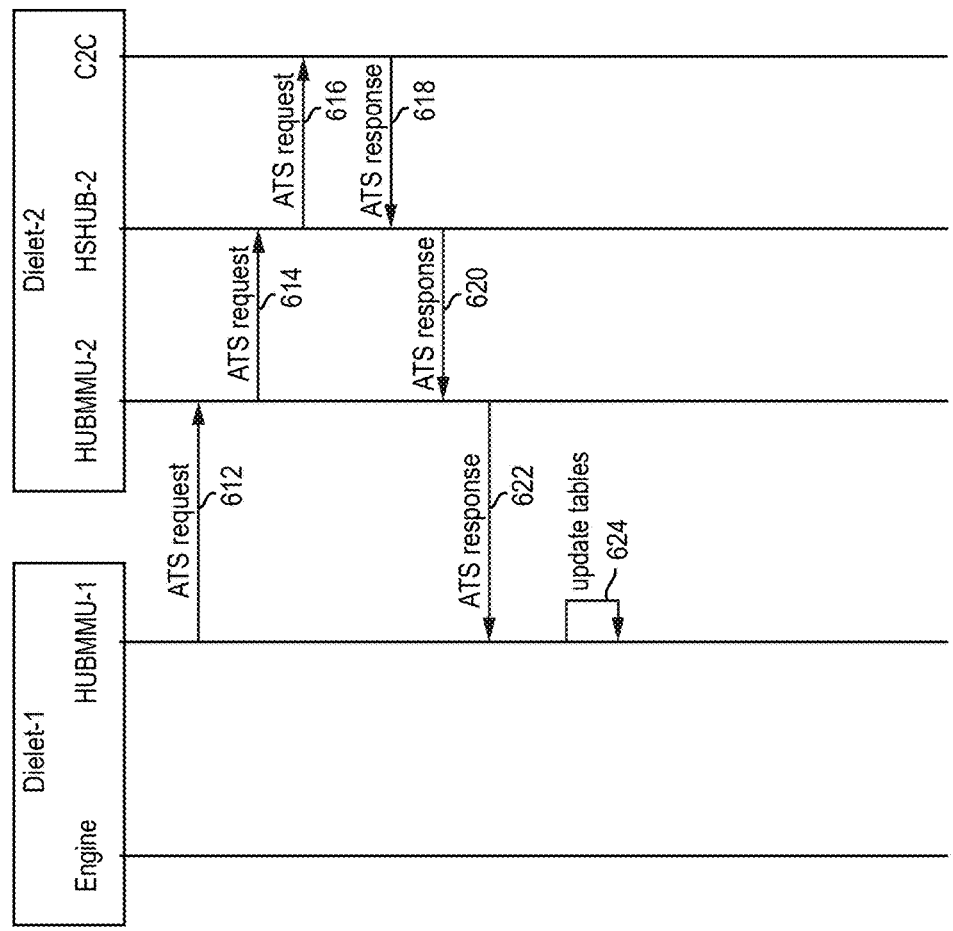
FIG. 6B illustrates an example flowchart of a process for Address Translation Service (ATS) requests and responses in a multi-dielet GPU in accordance with some embodiments of this disclosure.

FIG. 6B illustrates an example flowchart 610 of a process for ATS requests and responses in a multi-dielet GPU in accordance with some embodiments of this disclosure. As noted above, ATS requests may be generated by the HUBMMU's on any dielet during a page table walk. The multi-dielet GPU may be configured so that, although the generation of ATR is distributed among all dielets, the related communications with other devices (e.g., CPU, SMMU, IOMMU) and receiving the corresponding response is centralized at a dielet configured to be in the secondary role. In the scenario illustrated in FIG. 6B, in a 2-dielet GPU such as that in any of FIGS. 1-3 according to an embodiment, dielet-1 is configured as primary and dielet-2 is configured as secondary. As described in relation to FIG. 2, the C2C interface is active on dielet-2 and is not available (e.g., not present or set inactive) in dielet-1. The described scenario is for an ATR generated by the HUBMMU of dielet-1 (HUBMMU-1).

At 612, the HUBMMU-1 generates an ATR. This may be a result of a page table walk as described above. Since the multi-dielet GPU is configured to have dielet-2 as the serialization point for ATR/ATRsp, HUBMMU-1 forwards the ATR to dielet-2.

At 614, the HUBMMU of dielet-2 (HUBMMU-2) receives the ATR from HUBMMU-1 and serializes it with any other ATS requests (e.g., originated from either dielet-1 or dielet-2). It then arbitrates among the serialized ATS and sends the ATR to its local HSHUB.

At 616, the HSHUB on dielet-2 (HSHUB-2) sends the ATR to the C2C interface to any of the CPU, SMMU, etc.

At 618, the corresponding ATRsp is received at the C2C interface on dielet-2, and is forwarded to the local HSHUB-2.

At 620, the HSHUB-2 forwards the ATRsp to the local HUBMMU-2.

At 622, the HUBMMU-2 forwards the ATRsp to HUBMMU-1.

HUBMMU-1 may, based on the ATRsp, update the local TLB(s) with the information included in the ATRsp.

ATSD invalidation is identical, in terms of message flow, to TLB invalidation described in relation to FIG. 5. ATS invalidation invalidates TLB entries that are indicated as ATS entries. ATSD invalidation request and response, like TLB invalidate, is through HSHUB-2. ATSD invalidation request is received at HSHUB-2 from the SMMU and forwarded to HUBMMU-2. The HUBMMU-2 handles it similarly to a locally generated TLB invalidate and forwards the invalidation request to HUBMMU-1. The HUBMMU-1 initiates the corresponding TLB updates locally and notifies other dielets to do the TLB update in parallel. Subsequently, after the TLB updates have been acknowledged locally and all other dielets, HUBMMU-1 transmits the ack to the ATSD invalidation to HUBMMU-2 which send it, via HSHUB-2, to the SMMU.

As noted above, in some embodiments, ATS request to IOMMU/SMMU is sent through a secondary dielet in the multi-dielet processing system. For example, in an embodiment, a 2-dielet processing system such as that in FIGS. 1-3, the ATS request is sent through the secondary dielet HSHUB because it is the dielet that has an active C2C interface through which the ATS communication is performed in the particular embodiment. In some embodiments, if PCIe ATS requests are to be sent, such requests may be sent through the primary dielet which has the active PCIe interface. Each HUBMMU may include an ATS wrapper function to forward ATS messages.

Faults are detected independently by each dielet's MMUs (e.g., TLBs and fill unit in the HUBMMU). However, the HUBMMU of the primary dielet is configured to report faults, regardless of where (e.g., on which dielet) the fault originated. If a fault occurs in the secondary dielet, the secondary dielet forwards the fault information (e.g., fault type/ID, fault parameters, source engine/client for faulted command/request, source dielet ID, etc.) to the primary dielet, which then processes that information to generate a fault packet.

The fault packet may then be written into memory if fault buffer exists, may be written to a register, or reported by other means. As noted above, the fault information may include an ID of the engine or other component that caused the fault to be generated. This facilitates the CPU and/or other fault handling entity to initiate operations to respond to the fault.

Figure 6C:
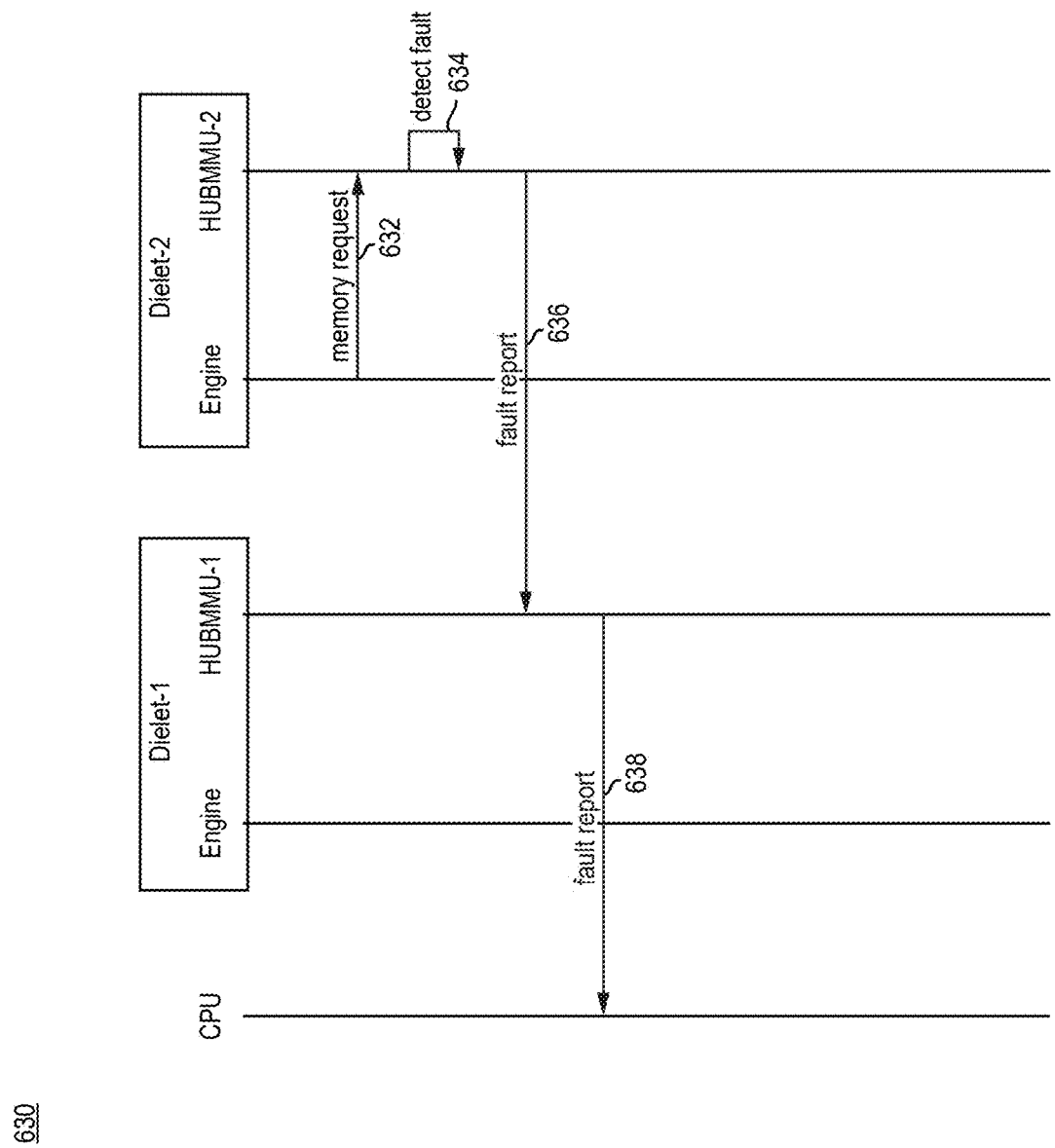
FIG. 6C illustrates a flowchart for a fault reporting process that can be used in a multi-dielet GPU according to some embodiments of the present disclosure.

FIG. 6C illustrates a flowchart 630 for a fault reporting process that can be used in a multi-dielet GPU, such as, for example, the 2-dielet GPU in any of FIGS. 1-3, according to some embodiments of the present disclosure.

At 632, an engine or process on an engine in dielet-2 transmits a memory request to its local HUBMMU (HUBMMU-2).

At 634, the HUBMMU-2 detects a fault (e.g., memory access violation). Each HUBMMU may implement a fault state machine to detect faults on the local dielet.

At 636, the HUBMMU-2 reports the fault to the HUBMMU on dielet 1 (HUBMMU-1).

At 638, HUBMMU-1 serializes error reports, and notified the CPU, SMMU or other fault handling entity regarding the fault. The fault handling entity may then, using information received in the fault report, respond to the fault.

A vidmem access bit (VAB) is a technique used to track memory segments that are accessed or modified since when tracking enabled or last VAB dump-and-clear at a specific point in time. It focuses on the physical addresses used by the program, providing valuable information for paging or debugging or VM swapping. A VAB dump captures the state of the system at a specific point in time, typically triggered by an event such as privileged register write or channel method.

In some embodiments, VAB is dumped by the HUBMMU that receives the VAB dump request (e.g., like TLB Invalidation). Each dielet tracks the VAB independently in its VAB mask (e.g., 4K bits VAB). In response to a VAB dump request, the following steps may be followed in sequence.

For example, on the primary dielet, a host sends a VAB dump packet to the local HUBMMU. The host sends the VAB dump request as part of a TLB Invalidation packet. However, no invalidation is done for that. A field in the invalidation packet may be used to identify that the invalidation request is for a VAB dump.

The primary HUBMMU sends the VAB dump packet to the secondary HUBMMU (and vice-versa if received at the secondary dielet).

Both HUBMMUs collect VAB independently from various tracking copies in the dielet.

The final merged VAB mask stored in HUBMMU. The secondary HUBMMU sends the final merged VAB to the primary HUBMMU into multiple chunks.

The primary HUBMMU may merge the VAB mask from the secondary HUBMMU, and the merged VAB mask is written into memory.

Figure 7:
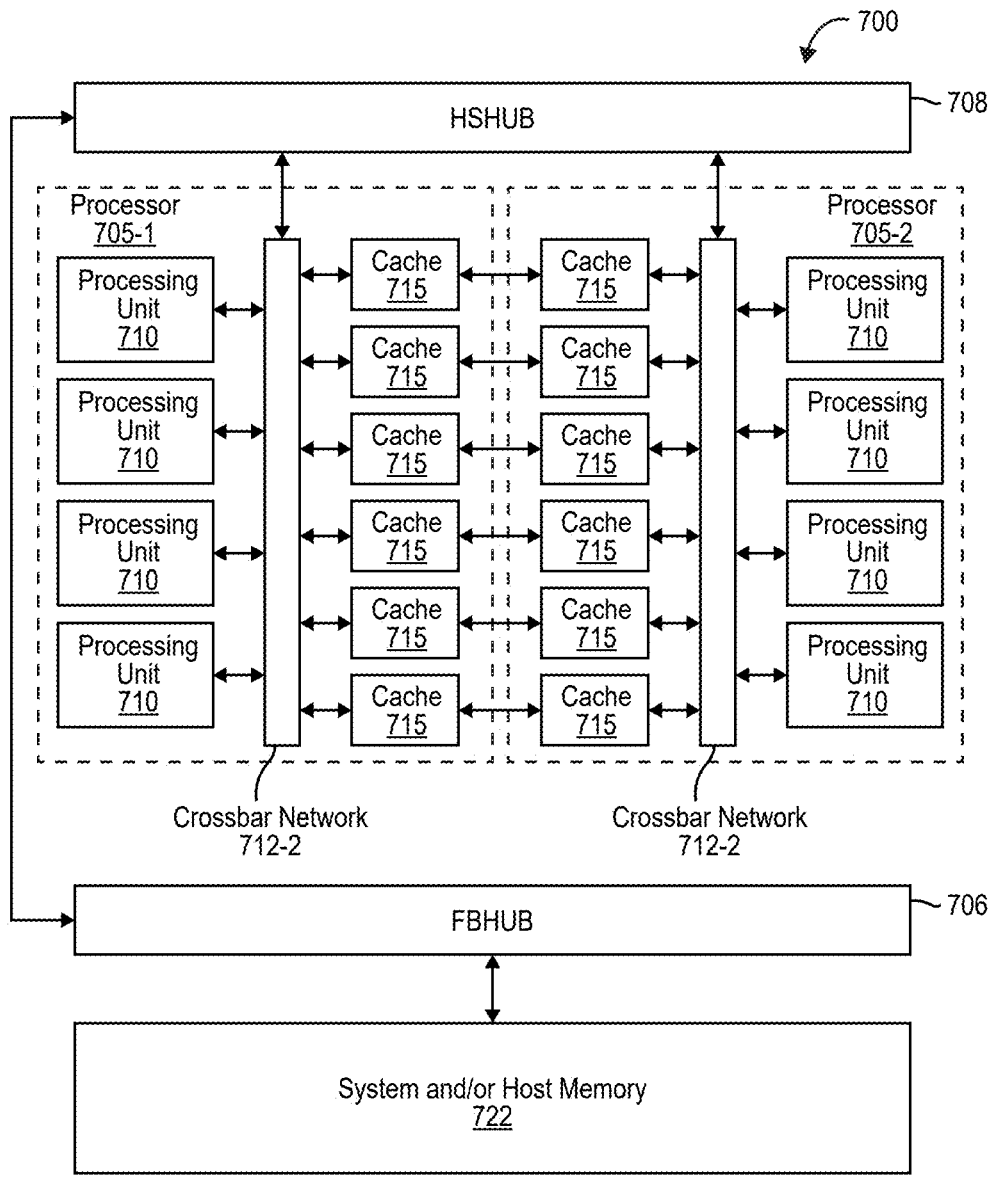
FIG. 7 illustrates an example GPU on a dielet of the multi-dielet GPU, with its frame buffer hub (FBHUB) and high speed hub (HSHUB) identified in relation to some of their interconnections, according to some embodiments of the present disclosure.

FIG. 7 illustrates an example GPU 700 on a dielet of the multi-dielet GPU, with its frame buffer hub (FBHUB) and high speed hub (HSHUB) identified in relation to some of their interconnections, according to some embodiments of the present disclosure. The GPU 700 includes two processors 705-1 and 705-2, with each processor comprising a plurality of processing units 710 connected to cache memory 715. Respective crossbars 712-1 and 712-2 interconnects processing units 710 and memory 715 in processors 705-1 and 705-2. A high speed hub (HSHUB) 718 connects all the processing units 710 and cache memory 715. A framebuffer hub (FBHUB) 720 provides access to system and/or host memory 722 to processing units 710, which connect to the FBHUB 720 via HSHUB 718.

Example GPU Architecture

An example illustrative architecture of a dielet in a multi-die GPU described in relation to FIGS. 1-6, is described. The following information is set forth for illustrative purposes and should not be construed as limiting in any manner. Any of the following features may be optionally incorporated with or without the exclusion of other features described.

Figure 8:
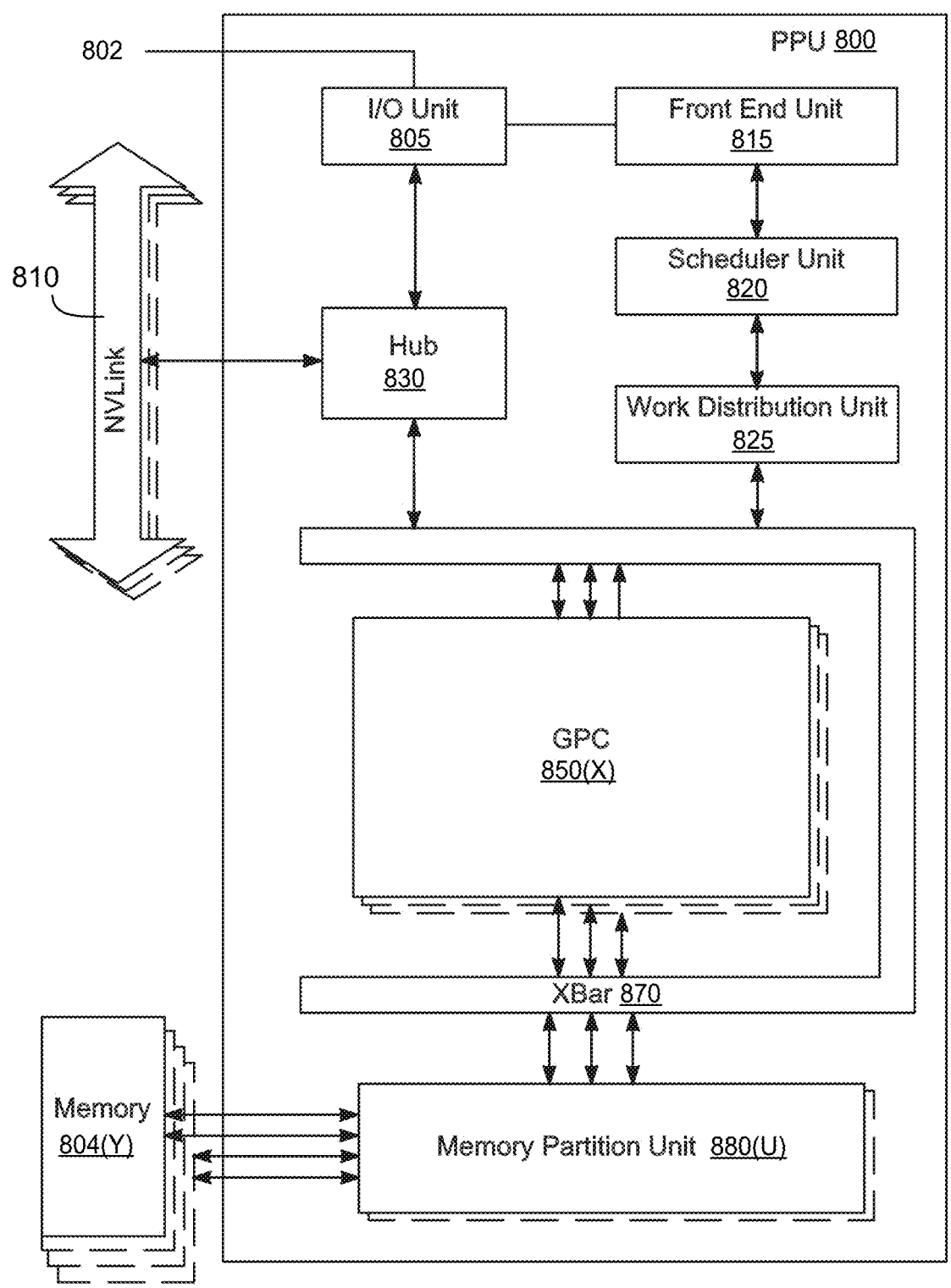
FIG. 8 illustrates an example parallel processing unit of a GPU, according to some embodiments.

FIG. 8 illustrates a parallel processing unit (PPU) 800 that may be included on a dielet of a multi-dielet GPU, in accordance with an embodiment. In an embodiment, the PPU 800 is a multi-threaded processor that is implemented on one or more integrated circuit devices. The PPU 800 is a latency hiding architecture designed to process many threads in parallel. A thread (e.g., a thread of execution) is an instantiation of a set of instructions configured to be executed by the PPU 800. In an embodiment, the PPU 800 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 800 may be utilized for performing general-purpose computations. In some other embodiments, PPU 800 configured to implement large neural networks in deep learning applications or other high performance computing applications.

One or more PPUs 800 may be configured to accelerate thousands of High Performance Computing (HPC), data center, and machine learning applications. The PPU 800 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 8, the PPU 800 includes an Input/Output (I/O) unit 805, a front end unit 815, a scheduler unit 820, a work distribution unit 825, a hub 830, a crossbar (Xbar) 870, one or more general processing clusters (GPCs) 850, and one or more partition units 880. The PPU 800 may be connected to a host processor or other PPUs 800 via one or more high-speed NVLink 810 interconnect. The PPU 800 may be connected to a host processor or other peripheral devices via an interconnect 802. The PPU 800 may also be connected to a memory comprising a number of memory devices 804. In an embodiment, the memory 804 may comprise a number of dynamic random access memory (DRAM) devices. The DRAM devices may be configured as a high-bandwidth memory (HBM) subsystem, with multiple DRAM dies stacked within each device.

The NVLink 810 interconnect enables systems to scale and include one or more PPUs 800 combined with one or more CPUs, supports cache coherence between the PPUs 800 and CPUs, and CPU mastering. Data and/or commands may be transmitted by the NVLink 810 through the hub 830 to/from other units of the PPU 800 such as one or more copy engines, a video encoder, a video decoder, a power management unit, etc. (not explicitly shown). The NVLink 810 is described in more detail in conjunction with FIG. 11A and FIG. 11B.

The I/O unit 805 is configured to transmit and receive communications (e.g., commands, data, etc.) from a host processor (not shown) over the interconnect 802. The I/O unit 805 may communicate with the host processor directly via the interconnect 802 or through one or more intermediate devices such as a memory bridge. In an embodiment, the I/O unit 805 may communicate with one or more other processors, such as one or more of the PPUs 800 via the interconnect 802. In an embodiment, the I/O unit 805 implements a Peripheral Component Interconnect Express (PCIe) interface for communications over a PCIe bus and the interconnect 802 is a PCIe bus. In alternative embodiments, the I/O unit 805 may implement other types of well-known interfaces for communicating with external devices.

The I/O unit 805 decodes packets received via the interconnect 802. In an embodiment, the packets represent commands configured to cause the PPU 800 to perform various operations. The I/O unit 805 transmits the decoded commands to various other units of the PPU 800 as the commands may specify. For example, some commands may be transmitted to the front end unit 815. Other commands may be transmitted to the hub 830 or other units of the PPU 800 such as one or more copy engines, a video encoder, a video decoder, a power management unit, etc. (not explicitly shown). In other words, the I/O unit 805 is configured to route communications between and among the various logical units of the PPU 800.

In an embodiment, a program executed by the host processor encodes a command stream in a buffer that provides workloads to the PPU 800 for processing. A workload may comprise several instructions and data to be processed by those instructions. The buffer is a region in a memory that is accessible (e.g., read/write) by both the host processor and the PPU 800. For example, the I/O unit 805 may be configured to access the buffer in a system memory connected to the interconnect 802 via memory requests transmitted over the interconnect 802. In an embodiment, the host processor writes the command stream to the buffer and then transmits a pointer to the start of the command stream to the PPU 800. The front end unit 815 receives pointers to one or more command streams. The front end unit 815 manages the one or more streams, reading commands from the streams and forwarding commands to the various units of the PPU 800.

The front end unit 815 is coupled to a scheduler unit 820 that configures the various GPCs 850 to process tasks defined by the one or more streams. The scheduler unit 820 is configured to track state information related to the various tasks managed by the scheduler unit 820. The state may indicate which GPC 850 a task is assigned to, whether the task is active or inactive, a priority level associated with the task, and so forth. The scheduler unit 820 manages the execution of a plurality of tasks on the one or more GPCs 850.

The scheduler unit 820 is coupled to a work distribution unit 825 that is configured to dispatch tasks for execution on the GPCs 850. The work distribution unit 825 may track a number of scheduled tasks received from the scheduler unit 820. In an embodiment, the work distribution unit 825 manages a pending task pool and an active task pool for each of the GPCs 850. The pending task pool may comprise a number of slots (e.g., 32 slots) that contain tasks assigned to be processed by a particular GPC 850. The active task pool may comprise a number of slots (e.g., 4 slots) for tasks that are actively being processed by the GPCs 850. As a GPC 850 finishes the execution of a task, that task is evicted from the active task pool for the GPC 850 and one of the other tasks from the pending task pool is selected and scheduled for execution on the GPC 850. If an active task has been idle on the GPC 850, such as while waiting for a data dependency to be resolved, then the active task may be evicted from the GPC 850 and returned to the pending task pool while another task in the pending task pool is selected and scheduled for execution on the GPC 850.

The work distribution unit 825 communicates with the one or more GPCs 850 via XBar 870. The XBar 870 is an interconnect network that couples many of the units of the PPU 800 to other units of the PPU 800. For example, the XBar 870 may be configured to couple the work distribution unit 825 to a particular GPC 850. Although not shown explicitly, one or more other units of the PPU 800 may also be connected to the XBar 870 via the hub 830.

The tasks are managed by the scheduler unit 820 and dispatched to a GPC 850 by the work distribution unit 825. The GPC 850 is configured to process the task and generate results. The results may be consumed by other tasks within the GPC 850, routed to a different GPC 850 via the XBar 870, or stored in the memory 804. The results can be written to the memory 804 via the partition units 880, which implement a memory interface for reading and writing data to/from the memory 804. The results can be transmitted to another PPU 804 or CPU via the NVLink 810. In an embodiment, the PPU 800 includes a number U of partition units 880 that is equal to the number of separate and distinct memory devices 804 coupled to the PPU 800. A partition unit 880 will be described in more detail below in conjunction with FIG. 9B.

In an embodiment, a host processor executes a driver kernel that implements an application programming interface (API) that enables one or more applications executing on the host processor to schedule operations for execution on the PPU 800. In an embodiment, multiple compute applications are simultaneously executed by the PPU 800 and the PPU 800 provides isolation, quality of service (QoS), and independent address spaces for the multiple compute applications. An application may generate instructions (e.g., API calls) that cause the driver kernel to generate one or more tasks for execution by the PPU 800. The driver kernel outputs tasks to one or more streams being processed by the PPU 800. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory (SMEM). Threads, cooperating threads and a hierarchical grouping of threads such as cooperating thread arrays (CTA) and cooperating group arrays (CGA) according to some embodiments are described in more detail in U.S. application Ser. No. 17/691,621, the entire content of which is hereby incorporated by reference in its entirety. The SMEM, according to some embodiments, is described in U.S. application Ser. No. 17/691,690, which is hereby incorporated in reference in its entirety.

Figure 9A:
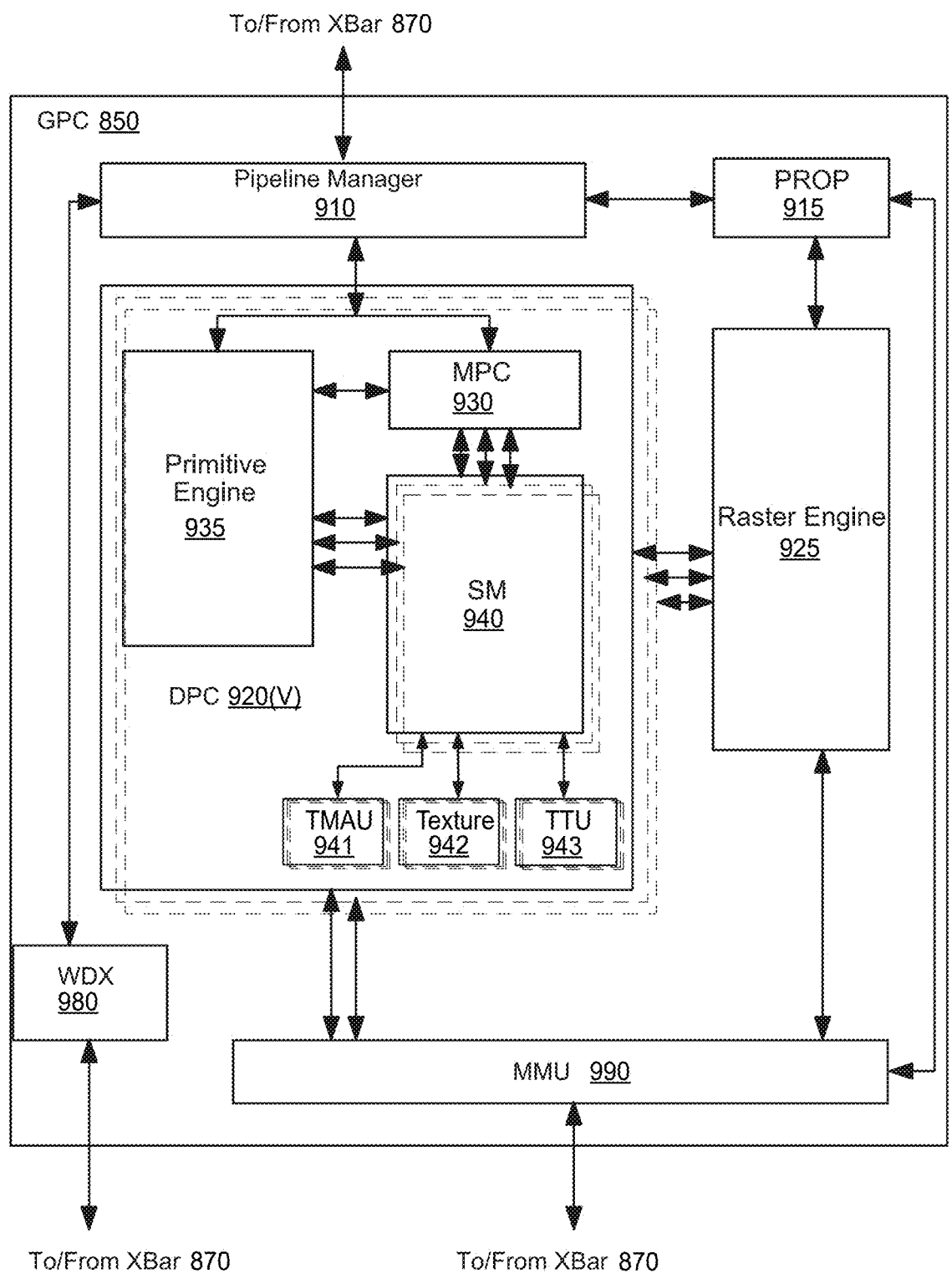
FIG. 9A illustrates an example general processing cluster (GPC) within the parallel processing unit of FIG. 8, according to some embodiments.

FIG. 9A illustrates a GPC 850 of the PPU 800 of FIG. 8, in accordance with an embodiment. As shown in FIG. 9A, each GPC 850 includes a number of hardware units for processing tasks. In an embodiment, each GPC 850 includes a pipeline manager 910, a pre-raster operations unit (PROP) 915, a raster engine 925, a work distribution crossbar (WDX) 980, a memory management unit (MMU) 990, and one or more Data Processing Clusters (DPCs) 920. It will be appreciated that the GPC 850 of FIG. 9A may include other hardware units in lieu of or in addition to the units shown in FIG. 9A.

In an embodiment, the operation of the GPC 850 is controlled by the pipeline manager 910. The pipeline manager 910 manages the configuration of the one or more DPCs 920 for processing tasks allocated to the GPC 850. In an embodiment, the pipeline manager 910 may configure at least one of the one or more DPCs 920 to implement at least a portion of a graphics rendering pipeline, a neural network, and/or a compute pipeline. For example, with respect to a graphics rendering pipeline, a DPC 920 may be configured to execute a vertex shader program on the programmable streaming multiprocessor (SM) 940. The pipeline manager 910 may also be configured to route packets received from the work distribution unit 825 to the appropriate logical units within the GPC 850. For example, some packets may be routed to fixed function hardware units in the PROP 915 and/or raster engine 925 while other packets may be routed to the DPCs 920 for processing by the primitive engine 935 or the SM 940.

Figure 9B:
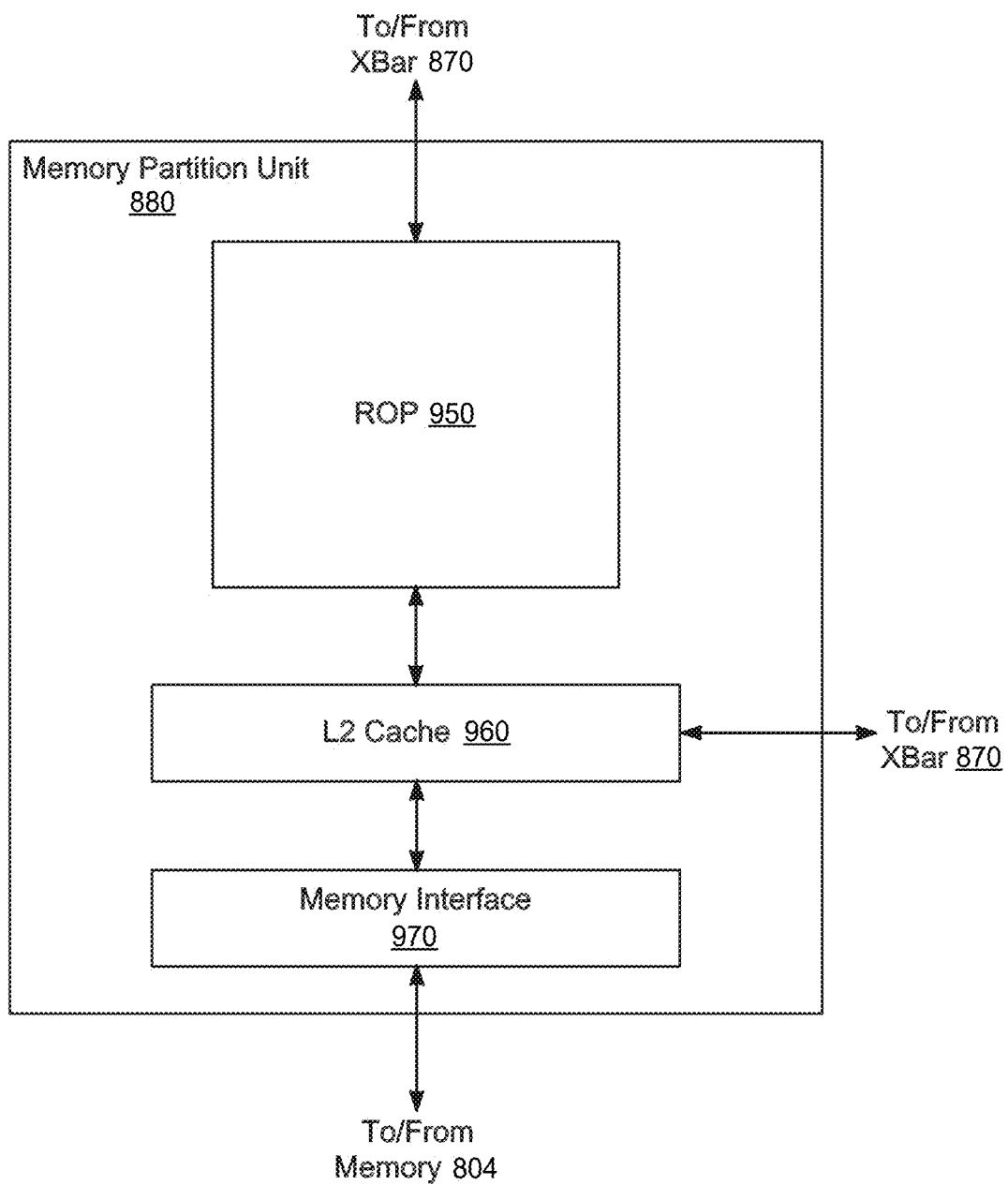
FIG. 9B illustrates an example memory partition unit of the parallel processing unit of FIG. 8.

The PROP unit 915 is configured to route data generated by the raster engine 925 and the DPCs 920 to a Raster Operations (ROP) unit, described in more detail in conjunction with FIG. 9B. The PROP unit 915 may also be configured to perform optimizations for color blending, organize pixel data, perform address translations, and the like.

Each DPC 920 included in the GPC 850 includes an M-Pipe Controller (MPC) 930, a primitive engine 935, and one or more SMs 940. The MPC 930 controls the operation of the DPC 920, routing packets received from the pipeline manager 910 to the appropriate units in the DPC 920. For example, packets associated with a vertex may be routed to the primitive engine 935, which is configured to fetch vertex attributes associated with the vertex from the memory 804. In contrast, packets associated with a shader program may be transmitted to the SM 940.

The SM 940 comprises a programmable streaming processor that is configured to process tasks represented by a number of threads. Each SM 940 is multi-threaded and configured to execute a plurality of threads (e.g., 32 threads) from a particular group of threads concurrently. In an embodiment, the SM 940 implements a SIMT (Single-Instruction, Multiple-Thread) architecture where each thread in a group of threads (e.g., a warp) is configured to process a different set of data based on the same set of instructions. All threads in the group of threads execute the same instructions. In another embodiment, the SM 940 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 940 is described in more detail below in conjunction with FIG. 10A. FIG. 10B conceptually illustrates four subpartitions 1091-1094 implemented in an SM such as the SM shown in FIG. 10A, according to some embodiments.

The MMU 990 provides an interface between the GPC 850 and the partition unit 880. The MMU 990 may provide translation of virtual addresses into physical addresses, memory protection, and arbitration of memory requests. In an embodiment, the MMU 990 provides one or more translation lookaside buffers (TLBs) for performing translation of virtual addresses into physical addresses in the memory 804.

FIG. 9B illustrates a memory partition unit 880 of the PPU 800 of FIG. 8 in accordance with an embodiment. As shown in FIG. 9B, the memory partition unit 880 includes a Raster Operations (ROP) unit 950, a level two (L2) cache 960, and a memory interface 970. The memory interface 970 is coupled to the memory 804. Memory interface 970 may implement 32, 64, 128, 1024-bit data buses, or the like, for high-speed data transfer. In an embodiment, the PPU 800 incorporates U memory interfaces 970, one memory interface 970 per pair of partition units 880, where each pair of partition units 880 is connected to a corresponding memory device 804. For example, PPU 800 may be connected to up to Y memory devices 804, such as high bandwidth memory stacks or graphics double-data-rate, version 5, synchronous dynamic random access memory, or other types of persistent storage.

In an embodiment, the memory interface 970 implements an HBM2 memory interface and Y equals half U. In an embodiment, the HBM2 memory stacks are located on the same physical package as the PPU 800, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 824 bits.

In an embodiment, the memory 804 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 800 process very large datasets and/or run applications for extended periods.

In an embodiment, the PPU 800 implements a multi-level memory hierarchy. In an embodiment, the memory partition unit 880 supports a unified memory to provide a single unified virtual address space for CPU and PPU 800 memory, enabling data sharing between virtual memory systems. In an embodiment the frequency of accesses by a PPU 800 to memory located on other processors is traced to ensure that memory pages are moved to the physical memory of the PPU 800 that is accessing the pages more frequently. In an embodiment, the NVLink 810 supports address translation services allowing the PPU 800 to directly access a CPU's page tables and providing full access to CPU memory by the PPU 800.

In an embodiment, copy engines transfer data between multiple PPUs 800 or between PPUs 800 and CPUs. The copy engines can generate page faults for addresses that are not mapped into the page tables. The memory partition unit 880 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 804 or other system memory may be fetched by the memory partition unit 880 and stored in the L2 cache 960, which is located on-chip and is shared between the various GPCs 850. As shown, each memory partition unit 880 includes a portion of the L2 cache 960 associated with a corresponding memory device 804. Lower level caches may then be implemented in various units within the GPCs 850. For example, each of the SMs 940 may implement a level one (L1) cache. The L1 cache is private memory that is dedicated to a particular SM 940. Data from the L2 cache 960 may be fetched and stored in each of the L1 caches for processing in the functional units of the SMs 940. The L2 cache 960 is coupled to the memory interface 970 and the XBar 870.

The ROP unit 950 performs graphics raster operations related to pixel color, such as color compression, pixel blending, and the like. The ROP unit 950 also implements depth testing in conjunction with the raster engine 925, receiving a depth for a sample location associated with a pixel fragment from the culling engine of the raster engine 925. The depth is tested against a corresponding depth in a depth buffer for a sample location associated with the fragment. If the fragment passes the depth test for the sample location, then the ROP unit 950 updates the depth buffer and transmits a result of the depth test to the raster engine 925. It will be appreciated that the number of partition units 880 may be different than the number of GPCs 850 and, therefore, each ROP unit 950 may be coupled to each of the GPCs 850. The ROP unit 950 tracks packets received from the different GPCs 850 and determines which GPC 850 that a result generated by the ROP unit 950 is routed to through the Xbar 870. Although the ROP unit 950 is included within the memory partition unit 880 in FIG. 9B, in other embodiment, the ROP unit 950 may be outside of the memory partition unit 880. For example, the ROP unit 950 may reside in the GPC 850 or another unit.

Figure 10A:
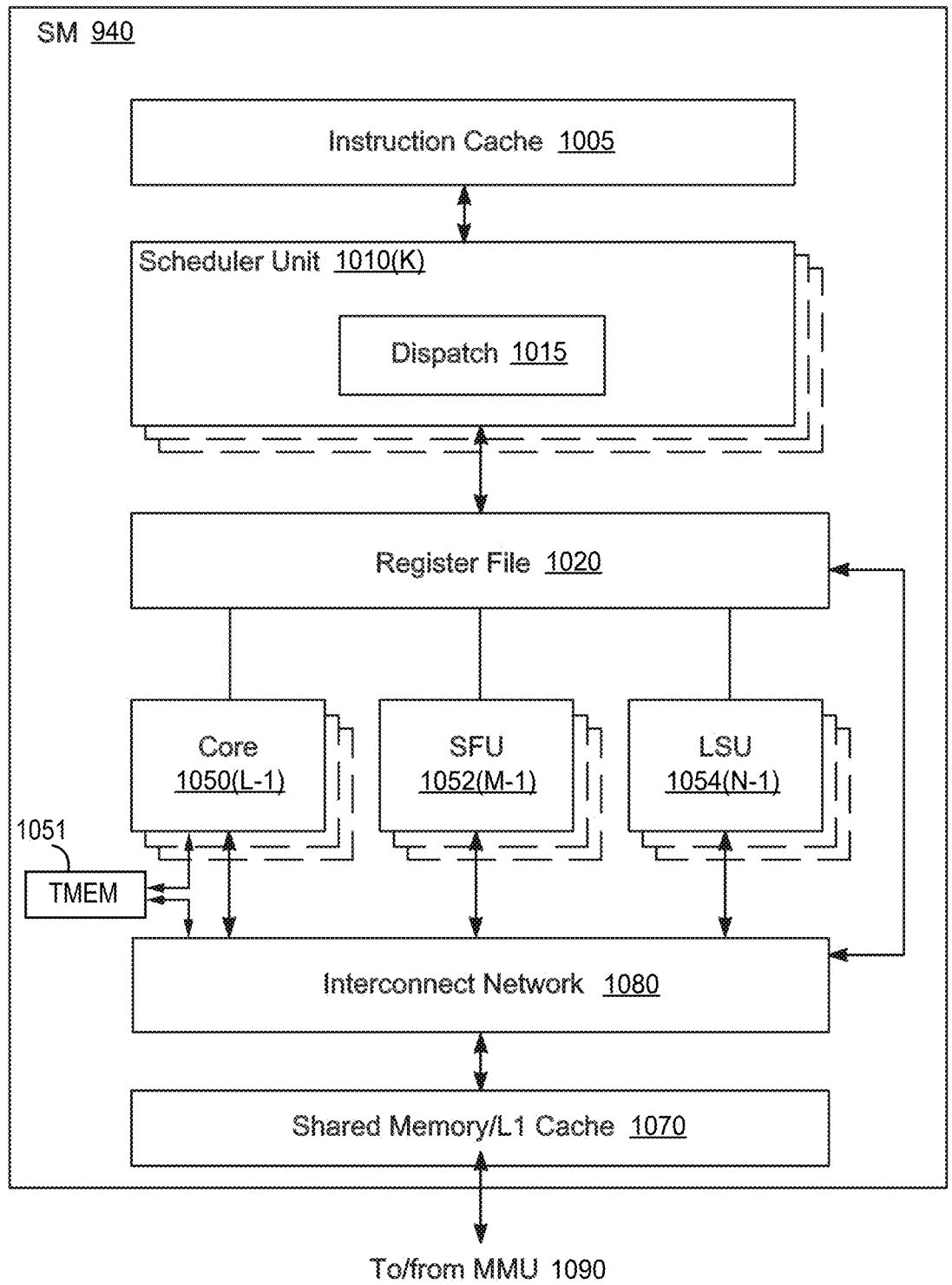
FIG. 10A illustrates an example streaming multiprocessor (SM) of FIG. 9A with MMA state machine circuitry, according to some embodiments.
Figure 10B:
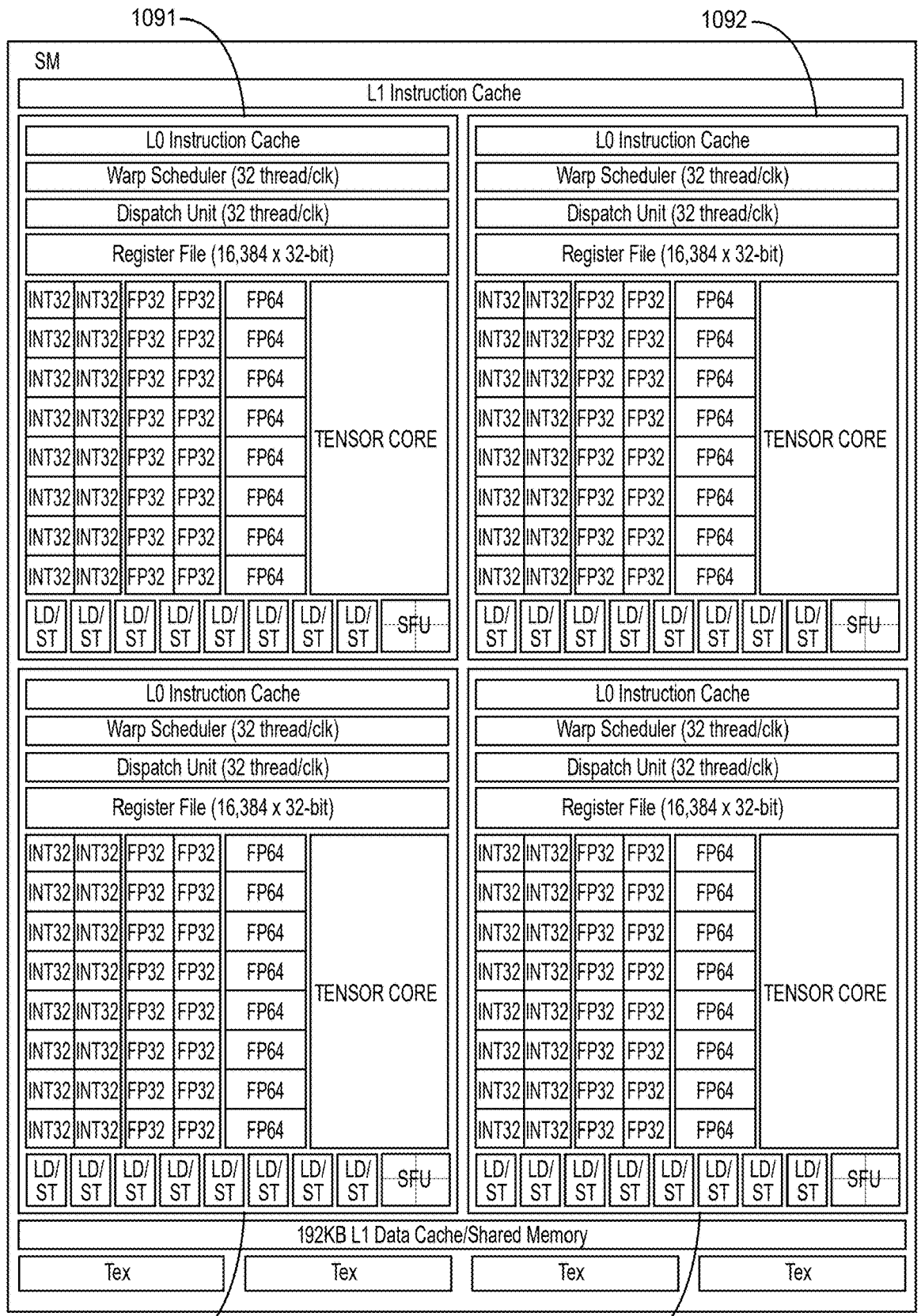
FIG. 10B conceptually illustrates four subpartitions implemented in an SM such as the SM shown in FIG. 10A, according to some embodiments.

FIG. 10A illustrates the streaming multiprocessor 940 of FIG. 9A, in accordance with an embodiment. As shown in FIG. 10A, the SM 940 includes an instruction cache 1005, one or more scheduler units 1010, a register file 1020, one or more processing cores 1050, one or more special function units (SFUs) 1052, one or more load/store units (LSUs) 1054, an interconnect network 1080, a SMEM/L1 cache 1070.

As described above, the work distribution unit 825 dispatches tasks for execution on the GPCs 850 of the PPU 800. The tasks are allocated to a particular DPC 920 within a GPC 850 and, if the task is associated with a shader program, the task may be allocated to an SM 940. The scheduler unit 1010 receives the tasks from the work distribution unit 825 and manages instruction scheduling for one or more thread blocks assigned to the SM 940. The scheduler unit 1010 schedules thread blocks for execution as warps of parallel threads, where each thread block consists of at least one warp. In an embodiment, each warp comprises 32 threads. The scheduler unit 1010 may manage a plurality of different thread blocks, allocating the different thread blocks to different warps and then dispatching instructions from the plurality of different cooperative groups to the various functional units (e.g., cores 1050, SFUs 1052, and LSUs 1054) during each clock cycle.

Cooperative Group Arrays (CGAs) provide a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Group Arrays enable programmers to define groups of threads explicitly at sub-block (e.g., as small as a single thread) and multi-block granularities, and to perform collective operations on the threads such as synchronization in a cooperative group. The programming model supports clean composition across software boundaries, so that libraries and utility functions can synchronize safely within their local context without having to make assumptions about convergence. Cooperative Group Array primitives enable new patterns of cooperative parallelism, including producer-consumer parallelism, opportunistic parallelism, and global synchronization across an entire grid of thread blocks. Hierarchical grouping of threads such as cooperating thread arrays (CTA) and cooperating group arrays (CGA) according to some embodiments are described in more detail in U.S. application Ser. No. 17/691,621, the entire content of which is hereby incorporated by reference in its entirety.

A dispatch unit 1015 is configured to transmit instructions to one or more of the functional units. In the embodiment, the scheduler unit 1010 includes two dispatch units 1015 that enable two different instructions from the same warp to be dispatched during each clock cycle. In alternative embodiments, each scheduler unit 1010 may include a single dispatch unit 1015 or additional dispatch units 1015.

Each SM 940 includes a register file 1020 that provides a set of registers for the functional units of the SM 940. In an embodiment, the register file 1020 is divided between each of the functional units such that each functional unit is allocated a dedicated portion of the register file 1020. In another embodiment, the register file 1020 is divided between the different warps being executed by the SM 940. The register file 1020 provides temporary storage for operands connected to the data paths of the functional units.

Each SM 940 comprises multiple processing cores 1050. In an embodiment, the SM 940 includes a large number (e.g., 128, etc.) of distinct processing cores 1050. Each core 1050 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic.

Tensor cores are configured to perform matrix operations, and, in an embodiment, one or more tensor cores are included in the cores 1050. In particular, the tensor cores are configured to perform deep learning matrix arithmetic, such as convolution operations for neural network training and inferencing.

In some embodiments, transposition hardware is included in the processing cores 1050 or another functional unit (e.g., SFUs 1052 or LSUs 1054) and is configured to generate matrix data stored by diagonals and/or generate the original matrix and/or transposed matrix from the matrix data stored by diagonals. The transposition hardware may be provided inside of the SMEM 1070 to register file 1020 load path of the SM 940.

Each SM 940 also comprises multiple SFUs 1052 that perform special functions (e.g., attribute evaluation, reciprocal square root, and the like). In an embodiment, the SFUs 1052 may include a tree traversal unit (e.g., TTU 943) configured to traverse a hierarchical tree data structure. In an embodiment, the SFUs 1052 may include texture unit (e.g., Texture Unit 942) configured to perform texture map filtering operations. In an embodiment, the texture units are configured to load texture maps (e.g., a 2D array of texels)

from the memory 1004 and sample the texture maps to produce sampled texture values for use in shader programs executed by the SM 940. In an embodiment, the texture maps are stored in the SMEM/L1 cache 970. The texture units implement texture operations such as filtering operations using mip-maps (e.g., texture maps of varying levels of detail). In an embodiment, each SM 940 includes two texture units.

Each SM 940 also comprises multiple LSUs 1054 that implement load and store operations between the SMEM/L1 cache 1070 and the register file 1020. Each SM 940 includes an interconnect network 1080 that connects each of the functional units to the register file 1020 and the LSU 1054 to the register file 1020, SMEM/L1 cache 1070. In an embodiment, the interconnect network 1080 is a crossbar that can be configured to connect any of the functional units to any of the registers in the register file 1020 and connect the LSUs 1054 to the register file 1020 and memory locations in SMEM/L1 cache 1070.

The SMEM/L1 cache 1070 is an array of on-chip memory that allows for data storage and communication between the SM 940 and the primitive engine 935 and between threads in the SM 940. In an embodiment, the SMEM/L1 cache 1070 comprises 128 KB of storage capacity and is in the path from the SM 940 to the partition unit 1080. The SMEM/L1 cache 1070 can be used to cache reads and writes. One or more of the SMEM/L1 cache 1070, L2 cache 960, and memory 1004 are backing stores.

Combining data cache and SMEM functionality into a single memory block provides the best overall performance for both types of memory accesses. The capacity is usable as a cache by programs that do not use SMEM. For example, if SMEM is configured to use half of the capacity, texture and load/store operations can use the remaining capacity. Integration within the SMEM/L1 cache 1070 enables the SMEM/L1 cache 1070 to function as a high-throughput conduit for streaming data while simultaneously providing high-bandwidth and low-latency access to frequently reused data.

In the context of this disclosure, an SM or "streaming multiprocessor" means a processor architected as described in U.S. Pat. No. 7,447,873 to Nordquist including improvements thereto and advancements thereof, and as implemented for example in many generations of NVIDIA GPUs. For example, an SM may comprise a plurality of processing engines or cores configured to concurrently execute a plurality of threads arranged in a plurality of single-instruction, multiple-data (SIMD) groups (e.g., warps), wherein each of the threads in a same one of the SIMD groups executes a same data processing program comprising a sequence of instructions on a different input object, and different threads in the same one of the SIMD group are executed using different ones of the processing engines or cores. An SM may typically also provide (a) a local register file having plural lanes, wherein each processing engine or core is configured to access a different subset of the lanes; and instruction issue logic configured to select one of the SIMD groups and to issue one of the instructions of the same data processing program to each of the plurality of processing engines in parallel, wherein each processing engine executes the same instruction in parallel with each other processing engine using the subset of the local register file lanes accessible thereto. An SM typically further includes core interface logic configured to initiate execution of one or more SIMD groups. As shown in the figures, such SMs have been constructed to provide fast local SMEM enabling data sharing/reuse and synchronization between all threads of a CTA executing on the SM.

When configured for general purpose parallel computation, a simpler configuration can be used compared with graphics processing. Specifically, the fixed function graphics processing units shown in FIG. 9A, are bypassed, creating a much simpler programming model. In the general purpose parallel computation configuration, the work distribution unit 1025 assigns and distributes blocks of threads directly to the DPCs 920. The threads in a block execute the same program, using a unique thread ID in the calculation to ensure each thread generates unique results, using the SM 940 to execute the program and perform calculations, SMEM/L1 cache 1070 to communicate between threads, and the LSU 1054 to read and write global memory through the SMEM/L1 cache 1070 and the memory partition unit 1080. When configured for general purpose parallel computation, the SM 940 can also write commands that the scheduler unit 1020 can use to launch new work on the DPCs 920.

The PPU 800, or a multi-dielet GPU comprising multiple PPU as described in this disclosure, may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 800 is embodied on a single semiconductor substrate. In another embodiment, the PPU 800 is included in a system-on-a-chip (SoC) along with one or more other devices such as additional PPUs 800, the memory 1004, a reduced instruction set computer (RISC) CPU, a memory management unit (MMU), a digital-to-analog converter (DAC), and the like.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 11A:
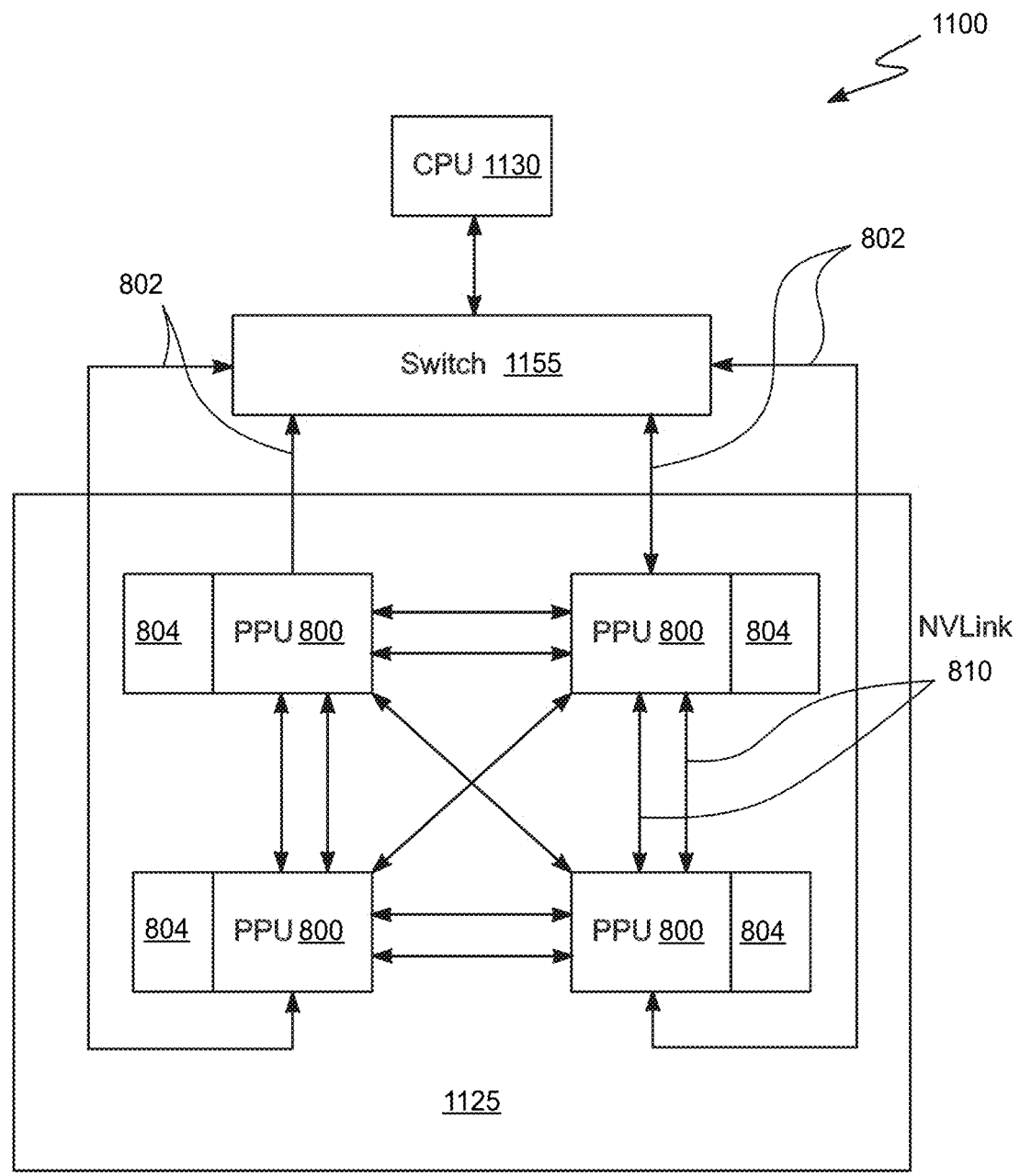
FIG. 11A is an example conceptual diagram of a processing system implemented using the parallel processing unit (PPU) of FIG. 8.

FIG. 11A is a conceptual diagram of a processing system 1100 implemented using multi-dielet GPUs 1000 that include two or more of the PPU 800 of FIG. 8, in accordance with an embodiment. The exemplary system 1100 may be configured to implement the methods disclosed in this application. The processing system 1100 includes a CPU 1130, switch 1155, and multiple multi-dielet GPUs each and respective memories 1004. The NVLink 1010 provides high-speed communication links between each of the multi-dielet GPUs. Although a particular number of NVLink 1010 and interconnect 1002 connections are illustrated in FIG. 11A, the number of connections to each multi-dielet GPU and the CPU 1130 may vary. The switch 1155 interfaces between the interconnect 1002 and the CPU 1130. The multi-dielet GPUs, memories 1004, and NVLinks 1010 may be situated on a single semiconductor platform to form a parallel processing module 1125. In an embodiment, the switch 1155 supports two or more protocols to interface between various different connections and/or links.

In another embodiment (not shown), the NVLink 1010 provides one or more high-speed communication links between each of the multi-dielet GPUs and the CPU 1130 and the switch 1155 interfaces between the interconnect 1002 and each of multi-dielet GPUs. The multi-dielet GPUs, memories 1004, and interconnect 1002 may be situated on a single semiconductor platform to form a parallel processing module 1125. In yet another embodiment (not shown), the interconnect 1002 provides one or more communication links between each of the multi-dielet GPUs and the CPU 1130 and the switch 1155 interfaces between each of the multi-dielet GPUs using the NVLink 1010 to provide one or more high-speed communication links between the multi-dielet GPUs. In another embodiment (not shown), the NVLink 1010 provides one or more high-speed communication links between the multi-dielet GPUs and the CPU 1130 through the switch 1155. In yet another embodiment (not shown), the interconnect 1002 provides one or more communication links between each of the multi-dielet GPUs directly. One or more of the NVLink 1010 high-speed communication links may be implemented as a physical NVLink interconnect or either an on-chip or on-die interconnect using the same protocol as the NVLink 1010.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1125 may be implemented as a circuit board substrate and each of the multi-dielet GPUs 1000 and/or memories 1004 may be packaged devices. In an embodiment, the CPU 1130, switch 1155, and the parallel processing module 1125 are situated on a single semiconductor platform.

In an embodiment, the NVLink 1010 allows direct load/store/atomic access from the CPU 1130 to each multi-dielet GPU's 1000 memory 1004. In an embodiment, the NVLink 1010 supports coherency operations, allowing data read from the memories 1004 to be stored in the cache hierarchy of the CPU 1130, reducing cache access latency for the CPU 1130. In an embodiment, the NVLink 1010 includes support for Address Translation Services (ATS), allowing the multi-dielet GPU 1000 to directly access page tables within the CPU 1130. One or more of the NVLinks 1010 may also be configured to operate in a low-power mode.

Figure 11B:
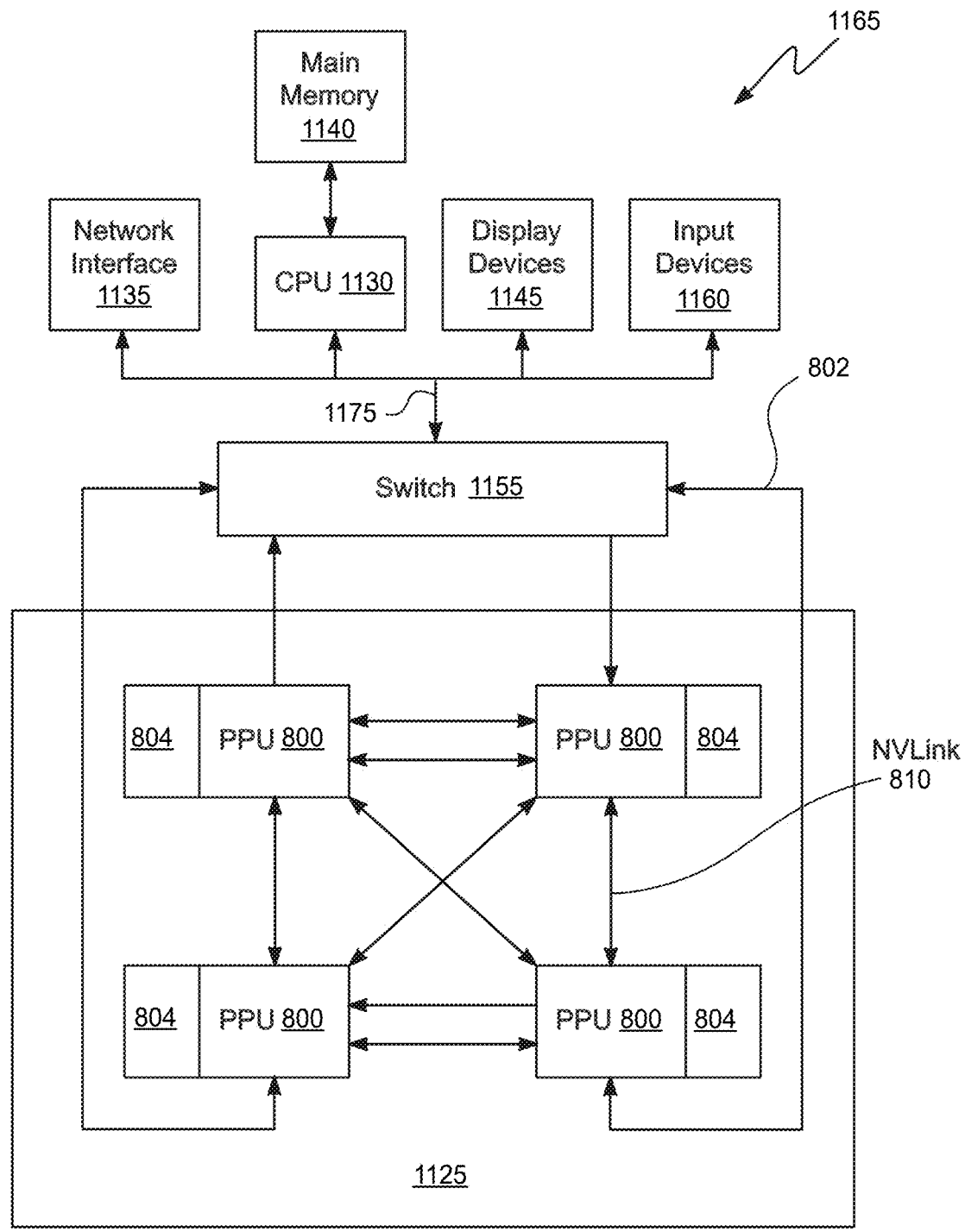
FIG. 11B is a block diagram of an exemplary system in which the various architecture and/or functionality of the various previous embodiments may be implemented.

FIG. 11B illustrates an exemplary system 1165 in which the various architecture and/or functionality of the various previous embodiments may be implemented. The exemplary system 1165 may be configured to implement the methods disclosed in this application.

As shown, a system 1165 is provided including at least one central processing unit 1130 that is connected to a communication bus 1175. The communication bus 1175 may be implemented using any suitable protocol, such as PCI (Peripheral Component Interconnect), PCI-Express, AGP (Accelerated Graphics Port), HyperTransport, or any other bus or point-to-point communication protocol(s). The system 1165 also includes a main memory 1140. Control logic (software) and data are stored in the main memory 1140 which may take the form of random access memory (RAM).

The system 1165 also includes input devices 1160, the parallel processing system 1125, and display devices 1145, e.g. a conventional CRT (cathode ray tube), LCD (liquid crystal display), LED (light emitting diode), plasma display or the like. User input may be received from the input devices 1160, e.g., keyboard, mouse, touchpad, microphone, and the like. Each of the foregoing modules and/or devices may even be situated on a single semiconductor platform to form the system 1165. Alternately, the various modules may also be situated separately or in various combinations of semiconductor platforms per the desires of the user.

Further, the system 1165 may be coupled to a network (e.g., a telecommunications network, local area network (LAN), wireless network, wide area network (WAN) such as the Internet, peer-to-peer network, cable network, or the like) through a network interface 1135 for communication purposes.

The system 1165 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1140 and/or the secondary storage. Such computer programs, when executed, enable the system 1165 to perform various functions. The memory 1140, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 1165 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

An application program may be implemented via an application executed by a host processor, such as a CPU. In an embodiment, a device driver may implement an application programming interface (API) that defines various functions that can be utilized by the application program in order to generate graphical data for display. The device driver is a software program that includes a plurality of instructions that control the operation of the multi-dielet GPU 1000 comprising 2 or more PPU 800. The API provides an abstraction for a programmer that lets a programmer utilize specialized graphics hardware, such as the PPU 800, to generate the graphical data without requiring the programmer to utilize the specific instruction set for the PPU 800. The application may include an API call that is routed to the device driver for the multi-dielet GPU. The device driver interprets the API call and performs various operations to respond to the API call. In some instances, the device driver may perform operations by executing instructions on the CPU. In other instances, the device driver may perform operations, at least in part, by launching operations on the multi-dielet GPU 1000 utilizing an input/output interface between the CPU and the multi-dielet GPU. In an embodiment, the device driver is configured to implement the graphics processing pipeline utilizing the hardware of the PPU 800.

Various programs may be executed within the multi-dielet GPU 1000 comprising 2 or more PPU 800 in order to implement the various stages of the processing for the application program. For example, the device driver may launch a kernel on the PPU 800 to perform one stage of processing on one SM 940 (or multiple SMs 940). The device driver (or the initial kernel executed by PPU 800) may also launch other kernels on the PPU 800 to perform other stages of the processing. If the application program processing includes a graphics processing pipeline, then some of the stages of the graphics processing pipeline may be implemented on fixed unit hardware such as a rasterizer or a data assembler implemented within the PPU 800. It will be appreciated that results from one kernel may be processed by one or more intervening fixed function hardware units before being processed by a subsequent kernel on an SM 940.

The techniques disclosed herein may be incorporated in any processor that may be used for processing a neural network such as, for example, a central processing unit (CPU), a graphics processing unit (GPU), an intelligence processing unit (IPU), neural processing unit (NPU), tensor processing unit (TPU), neural network processor (NNP), a data processing unit (DPU), a vision processing unit (VPU), an application specific integrated circuit (ASIC), a field-programmable gate array (FPGA), and the like. Such a processor may be incorporated in a personal computer (e.g., a laptop), at a data center, in an Internet of Things (IoT) device, a handheld device (e.g., smartphone), a vehicle, a robot, or any other device that performs inference, training or any other processing of a neural network. Such a processor may be employed in a virtualized system such that an operating system executing in a virtual machine on the system can utilize the processor.

As an example, a processor incorporating the techniques disclosed herein can be employed to process one or more neural networks in a machine to identify, classify, manipulate, handle, operate, modify, or navigate around physical objects in the real world. For example, such a processor may be employed in an autonomous vehicle (e.g., an automobile, motorcycle, helicopter, drone, plane, boat, submarine, delivery robot, etc.) to move the vehicle through the real world. Additionally, such a processor may be employed in a robot at a factory to select components and assemble components into an assembly.

As an example, a processor incorporating the techniques disclosed herein can be employed to process one or more neural networks to identify one or more features in an image or to alter, generate, or compress an image. For example, such a processor may be employed to enhance an image that is rendered using raster, ray-tracing (e.g., using NVIDIA RTX), and/or other rendering techniques. In another example, such a processor may be employed to reduce the amount of image data that is transmitted over a network (e.g., the Internet, a mobile telecommunications network, a WIFI network, as well as any other wired or wireless networking system) from a rendering device to a display device. Such transmissions may be utilized to stream image data from a server or a data center in the cloud to a user device (e.g., a personal computer, video game console, smartphone, other mobile device, etc.) to enhance services that stream images such as NVIDIA Geforce Now (GFN), Google Stadia, and the like.

As an example, a processor incorporating the techniques disclosed herein can be employed to process one or more neural networks for any other types of applications that can take advantage of a neural network. For example, such applications may involve translating from one spoken language to another, identifying and negating sounds in audio, detecting anomalies or defects during production of goods and services, surveillance of living and/or non-living things, medical diagnosis, decision making, and the like.

As an example, a processor incorporating the techniques disclosed herein can be employed to implement neural networks such as large language models (LLMs) to generate content (e.g., images, video, text, essays, audio, and the like), respond to user queries, solve problems in mathematical and other domains, and the like.

All patents, patent applications and publications cited herein are incorporated by reference for all purposes as if expressly set forth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A multi-dielet processing system comprising:
a first memory management unit (MMU) on a first dielet; and
a second MMU on a second dielet, wherein the first MMU on the first dielet is configured to process memory-related requests of a first type from the first dielet and the second dielet and to process memory-related requests of a second type from the first dielet, and
the second MMU on the second dielet is configured to forward the memory-related requests of the first type to the first MMU on the first dielet and to process the memory-related requests of the second type from the second dielet.

2. The multi-dielet processing system according to claim 1, wherein the second MMU is further configured to process memory-related requests of a third type received from the second dielet and the first dielet, and the first MMU is further configured to forward the memory-related requests of the third type to the second MMU.

3. The multi-dielet processing system according to claim 2, wherein the first MMU is configured to serialize the memory-related requests of the first type received from the first dielet and the second dielet, and the second MMU is configured to serialize the memory-related requests of the third type received from the first dielet and the second dielet.

4. The multi-dielet processing system in accordance with claim 2, wherein the first MMU is configured to, in response to at least one memory-related message of the first type, generate a message to transmit on a first type of network interface, wherein the second MMU is configured to, in response to at least one memory-related message of the third type, generate a message to transmit on a second type of network interface, wherein the second type of network interface is located on the second dielet.

5. The multi-dielet processing system according to claim 2, wherein the first MMU and the second MMU are each configured to detect an operational role in accordance with a respectively set configuration setting.

6. The multi-dielet processing system according to claim 5, wherein a third MMU located on a third dielet of the multi-dielet processing system detects, based on the configuration setting, a standalone operational role.

7. The multi-dielet processing system according to claim 5, wherein the first MMU detects, based on the respective set configuration setting, a primary operational role, and the second MMU detects, based on the respective set configuration settings, a secondary operational role.

8. The multi-dielet processing system according to claim 1, wherein the memory-related requests of the first type includes a bind request.

9. The multi-dielet processing system according to claim 8, wherein in response to the bind request, the first MMU is configured to: obtain bind information corresponding to the bind request, update at least one of a bind table and a page directory bind cache in a memory of the first dielet, and transmit the bind information to the second dielet.

10. The multi-dielet processing system according to claim 9, wherein the bind request is originated on the second dielet and transmitted to the first dielet by the second dielet, and wherein the second MMU is further configured to: in response to receiving the bind information from the first dielet, update at least one of a bind table and a page directory bind cache in a memory of the second dielet, and respond to a source of the bind request.

11. The multi-dielet processing system according to claim 10, wherein, in response to receiving the bind information, each of the first MMU and the second MMU is further configured to update at least one translation lookaside buffer (TLB) on the respective one of the first dielet and the second dielet in accordance with the bind information.

12. The multi-dielet processing system according to claim 1, wherein the memory-related requests of the first type further includes a fault reporting request, a TLB invalidate request, or VAB dump request.

13. The multi-dielet processing system according to claim 12, wherein the memory-related requests of the second type include an address translation request and each of the first MMU and the second MMU is configured to, in response to an address translation request, perform a lookup of a TLB and/or a page table.

14. The multi-dielet processing system according to claim 13, wherein the memory-related requests of the second type further include ECC interrupt, a GPU page table walk, a memory barrier request, memory to memory input output request, or packet generation for work creation request.

15. The multi-dielet processing system according to claim 1, wherein the second MMU is configured to, in response to a memory barrier request from the second dielet, transmit requests, preceding the memory barrier request from hardware engines, in a first phase and transmit one or more input output flush (I/O flush) requests in a second phase.

16. The multi-dielet processing system according to claim 1, wherein the second MMU is configured to, in response to a memory barrier request from the second dielet, transmit requests, preceding the memory barrier request from hardware engines, in a first phase and transmit an input output flush (I/O flush) request to the first MMU in a second phase, and the first MMU is configured to serialize execution of the IO flush requests.

17. The multi-dielet processing system according to claim 1, wherein the first MMU and the second MMU are each configured to provide for programming, by a software, one or more registers on the first dielet and the second dielet, respectively.

18. The multi-dielet processing system according to claim 1, wherein the first MMU and the second MMU are each configurable in one or three settings: primary, secondary, or standalone.

19. The multi-dielet processing system according to claim 1, further comprising a high speed interface connecting the first dielet and the second dielet, and the second MMU is configured to forward the memory-related requests of the first type over the high speed interface to the first MMU.

20. The multi-dielet processing system according to claim 19, wherein the high speed interface is a dedicated connection for dielet-to-dielet communication within the multi-dielet processing system.

21. The multi-dielet processing system according to claim 1, wherein a hardware engine remapping circuitry is configured to determine a globally unique dielet identifier for each dielet based on a dielet-identifying fuse signal.

22. The multi-dielet processing system according to claim 1, wherein a hardware engine remapping circuitry comprises a plurality of dielet-level remapping circuits, and each dielet-level remapping circuit is configured to operate independently of others of the dielet-level remapping circuits.

23. The multi-dielet processing system according to claim 9, wherein each dielet-level remapping circuit is configured to apply an offset to hardware engine identifiers in received messages, wherein the offset is determined based on a dielet-identifying fuse signal.

24. The multi-dielet processing system according to claim 1, wherein each dielet comprises a plurality of processing engines.

25. The multi-dielet processing system according to claim 1, wherein a plurality of parallel processors on respectively different dielets including the first dielet and the second dielet are in a single package, wherein the package is configured to be connected to a central processing unit (CPU) in a computer.

26. The multi-dielet processing system according to claim 1, wherein each of the first and second dielets is a graphics processing unit (GPU).

27. A method performed by a multi-dielet processing system configured to process a plurality of types of memory-related requests, wherein the multi-dielet processing system comprises a first memory management unit (MMU) on a first dielet and a second MMU on a second dielet, the method comprising:
processing, by the first MMU, memory-related requests of a first type from the first dielet and the second dielet and memory-related requests of a second type received from the first dielet;
forwarding, by the second MMU, memory-related requests of the first type to the first MMU; and
processing, by the second MMU, memory-related requests of the second type received from the second dielet.

* * * * *